US008387029B2

(12) United States Patent
Bird

(10) Patent No.: US 8,387,029 B2
(45) Date of Patent: Feb. 26, 2013

(54) DIRECT EXECUTION VIRTUAL MACHINE

(75) Inventor: Peter L. Bird, Ann Arbor, MI (US)

(73) Assignee: Hercules Software, LLC, Ann Arbor, MI (US)

( * ) Notice: Subject to any disclaimer, the term of this patent is extended or adjusted under 35 U.S.C. 154(b) by 975 days.

(21) Appl. No.: 11/492,274

(22) Filed: Jul. 25, 2006

(65) Prior Publication Data

US 2007/0022414 A1    Jan. 25, 2007

Related U.S. Application Data

(60) Provisional application No. 60/702,443, filed on Jul. 25, 2005.

(51) Int. Cl.
    *G06F 9/45* (2006.01)
(52) U.S. Cl. .................... 717/143; 717/139; 717/141
(58) Field of Classification Search .............. 717/114, 717/139, 143
    See application file for complete search history.

(56) References Cited

U.S. PATENT DOCUMENTS

| 6,138,273 | A | * | 10/2000 | Sturges | 717/114 |
|---|---|---|---|---|---|
| 6,401,210 | B1 | | 6/2002 | Templeton | |
| 6,715,141 | B1 | * | 3/2004 | Hodge | 717/139 |
| 6,901,519 | B1 | | 5/2005 | Stewart et al. | |
| 7,130,987 | B2 | * | 10/2006 | Sikdar | 712/200 |
| 2004/0031024 | A1 | * | 2/2004 | Fairweather | 717/143 |
| 2004/0123136 | A1 | | 6/2004 | Jung | |
| 2005/0149910 | A1 | * | 7/2005 | Prisament | 717/115 |
| 2006/0004996 | A1 | * | 1/2006 | Gonion | 712/241 |
| 2007/0106981 | A1 | | 5/2007 | Bird | |
| 2007/0294769 | A1 | | 12/2007 | Bird | |

FOREIGN PATENT DOCUMENTS

KR    1020030059565    7/2003

OTHER PUBLICATIONS

L.C. Paulson, "ML for the Working Programmer", 1996, Cambridge University, Second Edition, p. 57.*
Ogasawara et al., "A Study of Exception Handling and Its Dynamic Optimizations in Java", 2001, Proceedings of the 16th ACM SIGPLAN conference on Object oriented programming, systems, languages, and applications, pp. 83-95.*
Jerome Holland, "AnaGram: new LALR-1 parser generator", 1993, comp.compilers newsgroup.*
Parsifal Software, "AnaGram Parser Generator: Summary of Notation", 1997, retrieved from: http://web.archive.org/web/19970207001647/http://www.parsifalsoft.com/notate.html.*
Oualline, "Practical C Programming, 3rd Edition", 1997, O'Reilly Media, Chapter 8 and Chapter 9 excerpts.*

(Continued)

*Primary Examiner* — Chat Do
*Assistant Examiner* — Jue Wang
(74) *Attorney, Agent, or Firm* — Hamilton, DeSanctis & Cha LLP

(57) ABSTRACT

A method for parsing and executing a software program includes receiving a portion of a software program in an original linguistic form, wherein the portion of the software program includes a nonlinear program element having a body, and, while retaining the original linguistic form, directly executing the nonlinear program element by manipulating a parse state and an input stream of tokens representing the body of the nonlinear program element, wherein directly executing comprises executing tokens until the dynamic end of the nonlinear program element is reached. A system includes a tokenizer operable to tokenize the software program and a parser operable to directly execute a nonlinear program element in the software program by manipulating a parse state and an input stream of tokens representing the body of the nonlinear program element, while preserving the original linguistic form of the software program.

40 Claims, 14 Drawing Sheets

OTHER PUBLICATIONS

George Hansper, "Yacc—A Parser Generator" (hereinafter Hansper), 2000, retrieved from: http://web.archive.org/web/20001209083200/http://www.luv.asn.au/overheads/lex_yacc/yacc.html.*

Parsifal Software, "dxi: Direct Execution Interpreters", 2002, retrieved from: http://web.archive.org/web/20020902033829/http://www.parsifalsoft.com/examples/xidek/XIDEK/doc/dxi.htm.*

* cited by examiner

Stacks After Removing the First Function:

DIRECT EXECUTION VIRTUAL MACHINE

CROSS-REFERENCE TO RELATED APPLICATIONS

This application claims the benefit of Provisional Application No. 60/702,443, filed on Jul. 25, 2005, which is hereby incorporated by reference for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2005-2006 Hercules Software LLC.

FIELD

Embodiments of the present invention generally relate to program execution. More specifically, embodiments relate to direct execution virtual machines that directly execute software programs using denotational semantics which is bound to a functional (i.e. mathematical) characterization of a program's semantics, rather than operational semantics which is necessarily bound to, and dependent upon, an underlying (abstract) computer architecture.

BACKGROUND

Compilers are programs that translate an input stream to a (usually different) output stream. Generally compilers translate a program in some programming language (such as C or C++) into the binary machine instructions required for the program's execution on a specific computer architecture. In some cases, compilers are used as program analyzers to perform "source-to-source" translations which modify a source program to support optimizations. Compilers are usually organized into several phases (or passes): lexical translation into a token stream, parsing the token stream, analysis and code generation.

Lexical translation converts the input text stream into a collection of tokens (essentially compressing the input stream). The parsing phase checks to see that the token stream constitutes a "valid" program of the programming language. Validity of a program must not be confused with the notion of a "correct program." In the English language, for example, sentences can be valid but not correct, such as the sentences "The sky is always orange", or "The earth is flat." The output of this parsing phase is (usually) a graph of the program which is an intermediate representation (IR) which is used for subsequent analysis and transformations.

The analysis phase repeatedly examines the program to find patterns which can be transformed to enhance the efficient execution of the program. This phase may remove program sequences which never execute, for example. Or it may move instances of a redundant computations to a single point in the program. Finally, the code generation phase converts the IR into the machine instructions for the particular target computer architecture (e.g., IBM's Power PC, Intel's Pentium or x86, MIPS, SPARC, Java ByteCodes, etc.)

Notably, all of the above transformations are performed statically. That is, these transformations are carried out before the dynamic execution of the program. Generally, once the program has begun to execute, no further transformations are applied.

The desired output of the code generation phase is a sequence of machine instructions that mirror the behavior of the original source program. It is necessary to execute those instructions to effect the behavior of the program. If the target machine is a physical computer (such as the PowerPC or the Pentium), the program is "native", and generally runs very quickly. The target architecture might also be a Virtual Machine (VM) such as the Java Virtual Machine (or JVM) or Zend's VM for the language PHP. Traditionally, a virtual machine is a program that simulates the behavior of an abstract computer architecture by repeating the cycle: an instruction is fetched, its operands are fetched, the operation is performed, and any results are saved.

SUMMARY

Embodiments of the present invention relate generally to parsing and execution of a software program. From its original linguistic form, the software program is tokenized. Tokens from the tokenized software program are input to the system where they are parsed. Recognized token phrases are directly executed. Nonlinear program elements, such as functions, loops, or exception handlers, are executed by inserting the body of the nonlinear program element into the token stream, executing the stream, then removing any unexecuted tokens. Tokens can be inserted (or "injected") into the token stream to facilitate program flow control or runtime type conversion. As such, the original linguistic form of the software program can be preserved during parsing and execution of the program.

Embodiments of a computer-readable medium with computer-executable instructions cause a computer to carry out a process including receiving a portion of a software program having a nonlinear program element in an original linguistic form, and while retaining the original linguistic form, directly executing the nonlinear program element by manipulating a parse state and an input stream of tokens representing the body of the nonlinear program element, wherein directly executing comprises executing tokens until the dynamic end of the nonlinear program element is reached.

The nonlinear program element can include a function, a loop construct, or an exception handler. When the nonlinear program element is a function, directly executing the nonlinear program element can involve marking a parse stack index, inserting a token stream representing the body of the function at the head of the input token stream, resetting the parse stack index after directly executing the inserted executed body of the function, and removing any unexecuted tokens from the input token stream.

When the nonlinear program element comprises a loop construct, directly executing the nonlinear program element can include inserting the executed body of the loop construct at the head of the input token stream, and directly executing the body of the loop construct until the loop execution ends.

The process carried out by the computer may also include forming an iterator comprising tokens representing the body of the non-linear construct.

When the nonlinear program element comprises an exception handler having a try clause and a catch clause, direct execution can include marking the beginning of the try clause in the parse stack, and, upon detection of an exception during execution of the try clause, finding the mark point in the parse stack for the exception handler and discarding all tokens up to the end of the try clause.

Directly executing the nonlinear program element can be accomplished using table-driven parsers, or with a parser implemented using one or more recursive parsing functions. The one or more recursive parsing functions can be mutually recursive.

Embodiments of the process may further include injecting a token in the input token stream in a parser to facilitate runtime type conversion or runtime program flow control.

Embodiments of a method for parsing and executing a software program can include receiving a portion of the software program in an original linguistic form, wherein the portion of the software program includes a nonlinear program element having a body, and, while retaining the original linguistic form of the software program, directly executing the nonlinear program element by manipulating a parse state and an input stream of tokens representing the body of the nonlinear program element, wherein directly executing comprises executing tokens until the dynamic end of the nonlinear program element is reached.

Embodiments of a system for parsing and executing an input software program written in an original linguistic form include a tokenizer operable to tokenize the software program, and a parser operable to parse and directly execute a nonlinear program element in the software program by manipulating a parse state and an input stream of tokens representing the body of the nonlinear program element, while preserving the original linguistic form of the software program.

A more complete understanding of various embodiments of the present invention may be derived by referring to the detailed description of preferred embodiments and claims when considered in connection with the figures.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
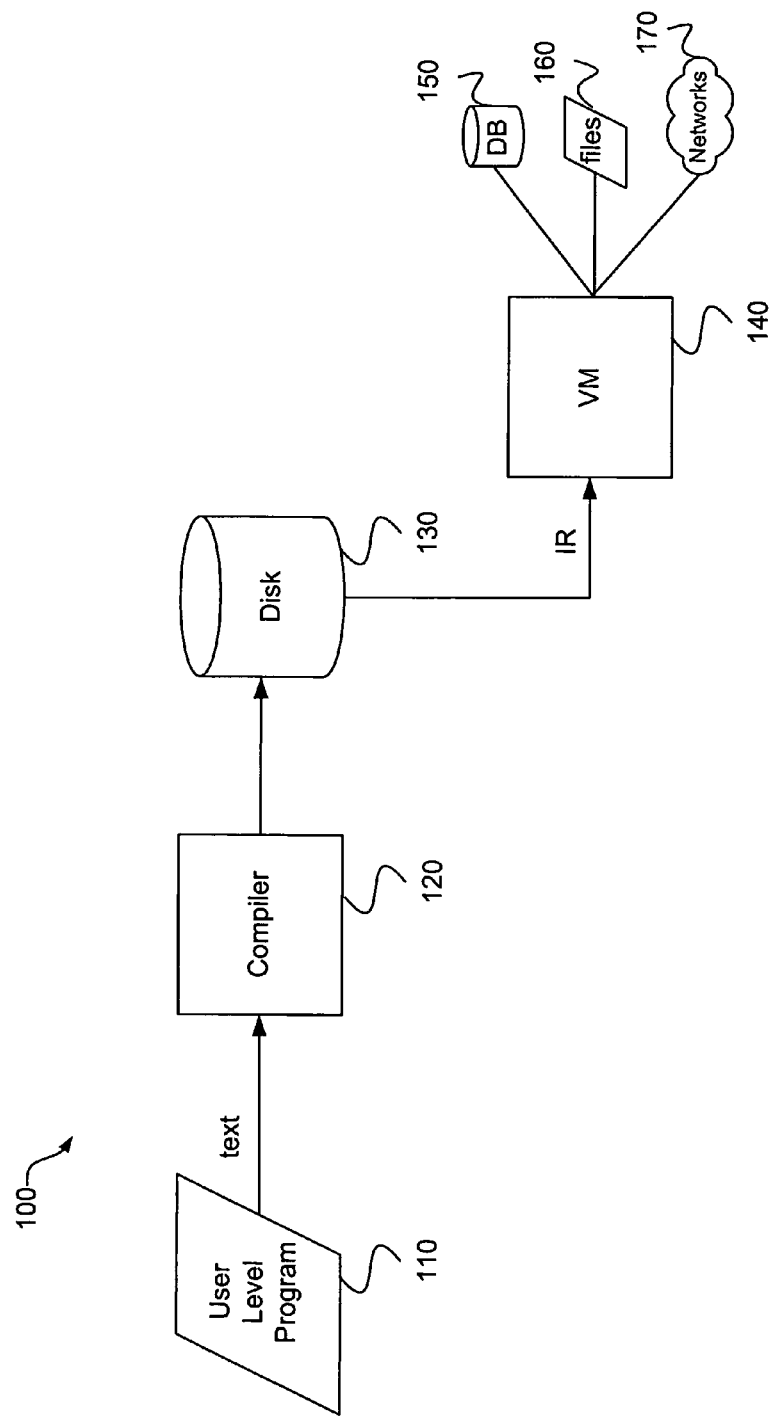
FIG. 1 illustrates an exemplary operating environment in which embodiments of the present invention may by employed.

Embodiments of the present invention relate generally to parsing and execution of a software program. From its original linguistic form, the software program is tokenized.

Tokens from the tokenized software program are input to the system where they are parsed. Recognized token phrases are directly executed. Nonlinear program elements, such as functions, loops, or exception handlers, are executed by inserting the body of the nonlinear program element into the token stream, executing the stream, then removing any unexecuted tokens. Tokens can be inserted (or "injected") into the token stream to facilitate program flow control or runtime type conversion. As such, the original linguistic form of the software program can be preserved during parsing and execution of the program.

In the following description, for the purposes of explanation, numerous specific details are set forth in order to provide a thorough understanding of embodiments of the present invention. It will be apparent, however, to one skilled in the art that embodiments of the present invention may be practiced without some of these specific details.

Embodiments of the present invention may be provided as a computer program product which may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

While, for convenience, embodiments of the present invention are described with reference to a virtual machine, embodiments of the present invention may be equally applicable to various other interpreters, compilers, translators, and the like.

For the sake of illustration, various embodiments of the present invention have herein been described in the context of computer programs, physical components, and logical interactions within modern computer networks. Importantly, while these embodiments describe various aspects of the invention in relation to modern computer networks and programs, the method and apparatus described herein are equally applicable to other systems, devices, and networks as one skilled in the art will appreciate. As such, the illustrated applications of the embodiments of the present invention are not meant to be limiting, but instead exemplary. Other systems, devices, and networks to which embodiments of the present invention are applicable include, but are not limited to, other types communication and computer devices and systems. More specifically, embodiments are applicable to communication systems, services, and devices such as cell phone networks and compatible devices. In addition, embodiments are applicable to all levels of computing from the personal computer to large network mainframes and servers.

Terminology

Brief definitions of terms, abbreviations, and phrases used throughout this application are given below.

The term "grammar" generally refers to a formal representation of the syntax and semantics of a language. According to various embodiments, the language may be a programming language, a human language, a mathematical language, and/ or the like. The elements of a grammar are symbols (terminal and non-terminal) and "rules" (also referred to as "production rules"). Terminal symbols are encountered in the source sentences of the language, whereas non-terminal symbols are "variables" used by the rules. Rules in the grammar are composed of terminal and non-terminal symbols and they show how to transform (or rewrite) phrases. The collection of rules together define the transformations that allow processing valid input sentences of a language. Note that an infinite number of distinct grammars specify a common language. Examples of types of grammars include, but are not limited to, analytical grammars, attribute grammars, context-free grammars, context-sensitive grammar, link grammars, parsing expression grammars, regular grammars, tree-adjoining grammars, and the like.

The term "production" implies an equivalency between two sequences of grammar symbols. A production includes a right-hand side (RHS) containing one of the sequences, and a left-hand side (LHS) containing the other sequence. The equivalency represents a single rewriting (or transformation) wherein the symbols in a token stream that match RHS of the production are transformed into the symbol(s) of the LHS of the production.

The phrase "context-free grammar" refers to a grammar in which the LHS of each production rule of the grammar is a single grammatical symbol.

The phrase "context-sensitive grammar" refers to a grammar where the LHS of a production rule can have multiple grammatical symbols, provided that the number of symbols on the LHS does not exceed the number of symbols on the RHS.

The phrase "linear program flow" refers to a sequence of operations that have a single operational flow. For example, a sequence of simple assignment statements in a program typically represents a linear flow for program execution. A linear flow may be broken by control operations such as conditionals (IF/ELSE), loops (FOR, WHILE, etc.), function calls, function returns, loop breaks or continues, exceptions and exception handlers, etc.

The phrase "non-linear program" or "non-linear program flow" refers to a sequence of operations and statement which contain control elements which can change the sequencing of those operations. Non-linear control elements include conditional (IF/ELSE), loops (FOR, WHILE, etc.), function calls, function returns, loop breaks or continues, exceptions and exception handlers, etc.

The term "source program" means the users' application programs written in the source language. A source program is typically processed by a compiler before executing on the given computer platform. Viewed from a formal perspective, a source program is a single sentence of a given language. This should not be confused by the fact that a program contains many statements. For ease of illustration, it is assumed here that the source program is a valid member of the given programming language.

The term "static semantics" means those aspects of a program that are not syntactic, yet establish if a program is correctly specified. These include: correct naming of variables, type compatibility of variables and their usage, correct naming and parameter usage of functions, correct naming of labels for statements, etc.

The term "dynamic semantics" refers to the meaning of a program established through its execution. Of course, the meaning of a program may change with each execution since different paths through the program may be followed.

The terms "intermediate form" (IF), "intermediate representation" (IR) and "intermediate language" (IL) are synonymous and all describe a source program representation that is produced by the first phase of compiler execution, and manipulated by subsequent phases of the compiler (notably analysis/optimization, and code generation). There are many kinds of IRs, but they broadly fall into two classes: graph structures or tuples. Graphical IRs are data structures link parent/child nodes with pointers. Tuples, on the other hand, are arrays of abstract machine instructions (specifying an operation and its operands). Tuples based representations have generally already suffered a binding of operands to (virtual) registers.

The term "attribute" refers to semantic information that is associated with phrases of a parsing operation. Attributes that flow up a parse tree are "synthesized" while attributes that flow down a parse tree are called "inherited". Attributes which are associated with terminal symbols are "constant"; these include variable names, constant values, etc.

A "linear time" algorithm is one that takes an amount of time that is a constant proportion of the length of the input. If there are "N" elements to process, then a linear algorithm takes time C×N, for some constant factor "C". A linear time algorithm is as efficient an algorithm for processing an input stream as can be (realistically) constructed with today's technology.

An "iterator" is a structure that controls the scanning over a collection of elements. In accordance with various embodiments iterators are used to maintain the scanning state while processing a stream of tokens.

The phrase "parse stack" generally refers to a stack that maintains the current state of a pattern matching automata for a grammar while processing a specific input stream.

The term "parser" generally refers to a module that analyzes an input sequence to determine the grammatical structure of the input sequence with respect to a given grammar and lexicon. The parser's operation will trace out the phrase structure of the input, and the parser may, as a side effect of operation, emit a structural description of the phrase structure. The structural description is often represented as a parse-tree, also called a phrase-marker, which is a diagrammatic representation of the sentence's constituent structure. According to some embodiments, a parser may first identify meaningful tokens in the input and then build a parse tree from those tokens. Two classes of parsers are top-down parsers and bottom-up parsers. Examples of top-down parsers include, but are not limited to, recursive descent parsers, LL parsers, Packrat parsers, and Unger parsers. Examples of bottom-up parsers include precedence parsers, bounded context parsers, LR parsers, SLR parsers, LALR parsers, canonical LR parsers, GLR parsers, Earley parsers, and CYK parsers.

The term "phrase" generally refers to a distinct linguistic pattern of tokens. In one embodiment, the term phrase may correspond to the right hand side (RHS) of a production of a grammar.

The terms "program," "computer program," and "software program" generally refers to a sequence of commands for a computer represented in the syntax and semantics of a specific programming language. In some cases, a program may refer to a nonlinear sequence of commands. While in other embodiments, a program may refer to a linear sequence of commands. Still yet, in other embodiments a program may be a combination of linear and nonlinear sequences of commands. A program may also comprise a collection of other programs and related resources.

The term "stack" generally refers to a programmatic data structure in which elements are added to and removed from the top of the structure. According to some embodiments, a stack may be LIFO or last-in, first-out. That is, the last element which is added to the stack is the first element to be retrieved from the stack. In various embodiments, a stack may be implemented in software, hardware, or a combination thereof. Examples of common operations that a stack may support include, but are not limited to, one or more of the following operations: push, pop, duplicate, peek, swap, and/or rotate.

The term "token" generally refers to a basic, grammatically indivisible unit of a language such as a keyword, operator or identifier. A token may be composed of one or more symbols or a primitive block of one or more characters of a language. For example, the textual representations of the atomic linguistic elements of a computer language (IF, "+", or variable names) are tokens, which can be converted into single numeric values which represent the actual input symbol of the language.

In one embodiment, a program may be "tokenized". That is, all tokens of the program are processed and organized as a list of token values.

The phrase "token stream" generally refers to a stream whose elements are program tokens. A token stream is a sequence of tokens from the list of the tokenized program. In one embodiment, the management of a token stream is accomplished with iterators.

The phrase "token stream stack" generally refers to a stack that holds a collection of token streams (or iterators of token streams) during the processing of a specific source program.

The term "interpreter" generally refers to a computer program that translates and executes each statement or construct of a source computer program in a fashion that represents the semantics of the source program.

The term "virtual machine" or "VM" generally refers to a self-contained operating environment that behaves as if it is a separate computer. A VM is an interpreter of programs for that emulated computer. A virtual machine is typically completely defined and implemented in software rather than hardware. It is often referred to as a "runtime environment." Virtual machines may be used to simulate the actions of a microprocessor or parse special VM-specific code. One example of a VM is the Java Virtual Machine (JVM).

The terms "connected" or "coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed there between, while not sharing any physical connection on with another. Based on the disclosure provided herein, one of ordinary skill in the art will appreciate a variety of ways in which connection or coupling exists in accordance with the aforementioned definition.

The term "responsive" includes completely or partially responsive.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phases do not necessarily refer to the same embodiment.

If the specification states a component or feature "may", "can", "could", or "might" be included or have a characteristic, that particular component or feature is not required to be included or have the characteristic.

The phrases "memory store" or "data store" generally refer to any device, mechanism, or populated data structure used for storing information. For purposes of this patent application, "memory store" or "data store" are intended to encompass, but are not limited to, one or more databases, one or more tables, one or more files, volatile memory, nonvolatile memory and dynamic memory. By way of further illustration, for example, random access memory, memory storage devices, and other recording media are covered by the phrase "memory store" or "data store." Common examples of a memory store include, but are not limited to, magnetic media such as floppy disks, magnetic tapes, hard drives and/or the like. Other examples of "memory stores" include SIMMs, SDRAM, DIMMs, RDRAM, DDR RAM, SODIMMS, optical memory devices such as compact disks, DVDs, and/or the like. In addition, a "memory store" may include one or more disk drives, flash drives, databases, local cache memories, processor cache memories, relational databases, flat databases, and/or the like. This list is no way meant to be an exhaustive list of devices and/or data structures falling with in the definition of "memory store," but is instead meant to highlight some examples. Those skilled in the art will appreciate many additional devices and techniques for storing information which are intended to be included within the phrase "memory store."

The term "module" refers to a self-contained functional component. A module can be implemented in software, hardware, firmware, or any combination thereof.

The phrase "code module" generally refers to any file that contains information that may be interpreted by a computer system. Examples of code modules include executable objects, file system objects, data files, text files, script files and/or the like. Furthermore, code module objects, such as visual basic scripts, java scripts, Windows®-based scripts, java applets, and/or the like, are intended to be encompassed by the phrase "code module." Common file extensions of executable objects include, but are not limited to, .exe, .com, .sys, .dll, scr, .cpl, api, .drv, .bpl and/or the like. File system objects include objects like device drivers, network interfaces, and/or the like. Other examples of code modules may include files using the IEEE-695 standard, S-records, PEF/CFM Mach-O (NeXT, Mac OS X), a.out (Unix/Linux), COFF (Unix/Linux), ECOFF (Mips), XCOFF (AIX), ELF (Unix/Linux), Mach-O (NeXT, Mac OS X), Portable Executable, IBM 360 object format, NLM, OMF, SOM (HP), XBE (Xbox executable), and/or the like.

The term "computer-readable medium" refers to an element through which data is communicated to or from a computing device. The data that is communicated can include, but is not limited to, computer-executable instructions, which cause the computing device to implement a process. The term computer-readable media includes computer storage media and communications media. Computer storage media generally refers to any type of computer-readable memory, such as, but not limited to, volatile, non-volatile, removable, or non-removable memory. Computer storage media may include magnetic media, optical media, or others. Communication media refers to a modulated signal carrying computer-readable data, such as, without limitation, program modules, instructions, or data structures.

Most virtual machines (VMs) are built upon an Operational Semantics model. Operational Semantics are specified by defining an abstract computer architecture, and then demonstrating how specific programming language constructs (loops, function calls, data access, etc.) are handled by the instructions of the computer architecture. An early example of the use of Operational Semantics is the Vienna Definition Language that was developed by IBM's research group in the early 1970s. (See, e.g., Wegner, Peter, *ACM Computing Sur-* veys, Brown University, Vol. 4, Issue 1, pp. 5-63, 1972; Lindholm, Tim, et al., *The Java™ Virtual Machine Specification*, Addison-Wesley Professional, 2$^{nd}$ ed., 1999; Aho, Alfred, et al., *Compilers: Principles. Techniques and Tools*, Addison Wesley, 2$^{nd}$ ed., Aug. 31, 2006).

In an Operational Semantic specification, language operations are performed by machine instructions that operate upon data held either in registers or in memory locations.

A traditional virtual machine (VM) is based upon an Operational Semantic model. The VM implements a traditional computer architecture. As described above, the source program is translated into a collection of instructions that operate upon registers and program memory. The VM follows a continuous loop that is equivalent to that of a hardware computer:

1. fetch an instruction
2. decode the instruction type
3. fetch the operands of the instruction
4. perform the operation
5. save the results of the operation (if necessary or appropriate)

The foregoing loop corresponds to the fundamental operational loop of any (so-called) Von Neumann computer. Note that operands may be either in registers or in memory. Note, also, that an operation may change control flow (such as a program "branch") and therefore may not affect any datum in the program (other than the program counter).

Traditional VMs employ a compiler that translates the source program into a sequence of machine instructions that operate upon storage locations (registers and memory locations). In contrast, embodiments of VMs described herein retain the original program form as a linear token stream, and directly execute (or interpret) that linguistic form using augmented parsers.

In contrast, Denotational Semantics is an alternate means of specifying the semantics of programming languages, generally by using the phrase structure of a grammar for the language, and collections of mathematical functions. Each distinct syntactic phrase of a language has an associated functional semantic interpretation. The usage of each phrase of the language is specified by the productions of the grammar. The semantics of the language is formed from the composite semantics of all phrases of the language. Historically, Denotational Semantics has been used to specify the semantics of languages (and their constituent constructs) and has not been widely used to understand the meaning of specific source programs.

Embodiments of VMs described herein directly execute a Denotation Semantic representation of the language. The base linguistic representation of the source program is applied to the Denotational Semantic specification of the language. The result of this application is the "meaning" of the program, which is established by dynamically determining the meaning of each distinct phrase of the program under the dynamic control sequencing of the source program token stream.

Embodiments described herein can make use of an augmented CFG parser. One benefit of using a CFG parser is that modern implementation algorithms are linear in time. This means that a VM based upon a CFG parser can be very efficient.

In accordance with various embodiments of the VM described here, it is useful but not necessary to translate the program into a token stream and then initially parse that stream to ensure syntactic and static semantic correctness. Moreover, it is desirable to provide explicit terminators for all control constructs (IF/FI, WHILE/ELIHW). This simplifies the construction of the parser that implements the dynamic semantics.

Parsers are pattern-matching algorithms. The sophistication of the pattern matcher used by the parser determines the degree of complexity of description that is possible with the language. Most parsers are built using context-free grammars. It is certainly possible to change the parsing algorithm itself during parse operations to detect more complex languages (context-sensitive languages).

In 1957, Noam Chomsky showed that there are four classes of mathematical (or formal) languages and that each has a direct relationship to a specific class of computer (or automata) that can accept "sentences" written in that language. Although there may be an infinite number of sentences for any language, the language itself can be characterized by a grammar containing a finite number of productions.

A production (also refered to herein as a "rule" or a "production rule") specifies a rewriting rule for strings. A production has a left-hand side (LHS) and a right-hand side (RHS) and is made up of external and internal symbols. The external symbols (usually called tokens or terminals) are used to write language sentences that serve as input. The internal symbols (usually called non-terminals) are variables that represent strings of symbols. Each production specifies an equivalence transformation: during the syntactic analysis of a "sentence", the symbols of the RHS of a production can be replaced by the symbols of the LHS to thereby preserve the processing specified by the string. Parsers are automata (or algorithms) that determine whether the sentence is valid for (is a member of) the given language. Parsers work by successive application of the productions of a grammar to an input sentence.

A context-free grammar (CFG) has productions where the LHS has a single internal symbol and the RHS is composed of any (finite) combination of internal and external symbols. A CFG that characterizes parenthesized arithmetic expressions can be represented with four productions:

| expr | → expr '+' expr | production rule (1) |
|------|-----------------|---------------------|
|      | → expr '*' expr | production rule (2) |
|      | → '(' expr ')'  | production rule (3) |
|      | → CONSTANT      | production rule (4) |

The foregoing productions characterize the form of all parenthesized expressions for constant values using the operators of addition and multiplication. Sentences can be formed using constant values, operators, and expressions. Examplary sentences used below for illustration are:

3+4*7                                                                      sentence (1)

(2+1)*(3+5)                                                sentence (2)

Figure 3:
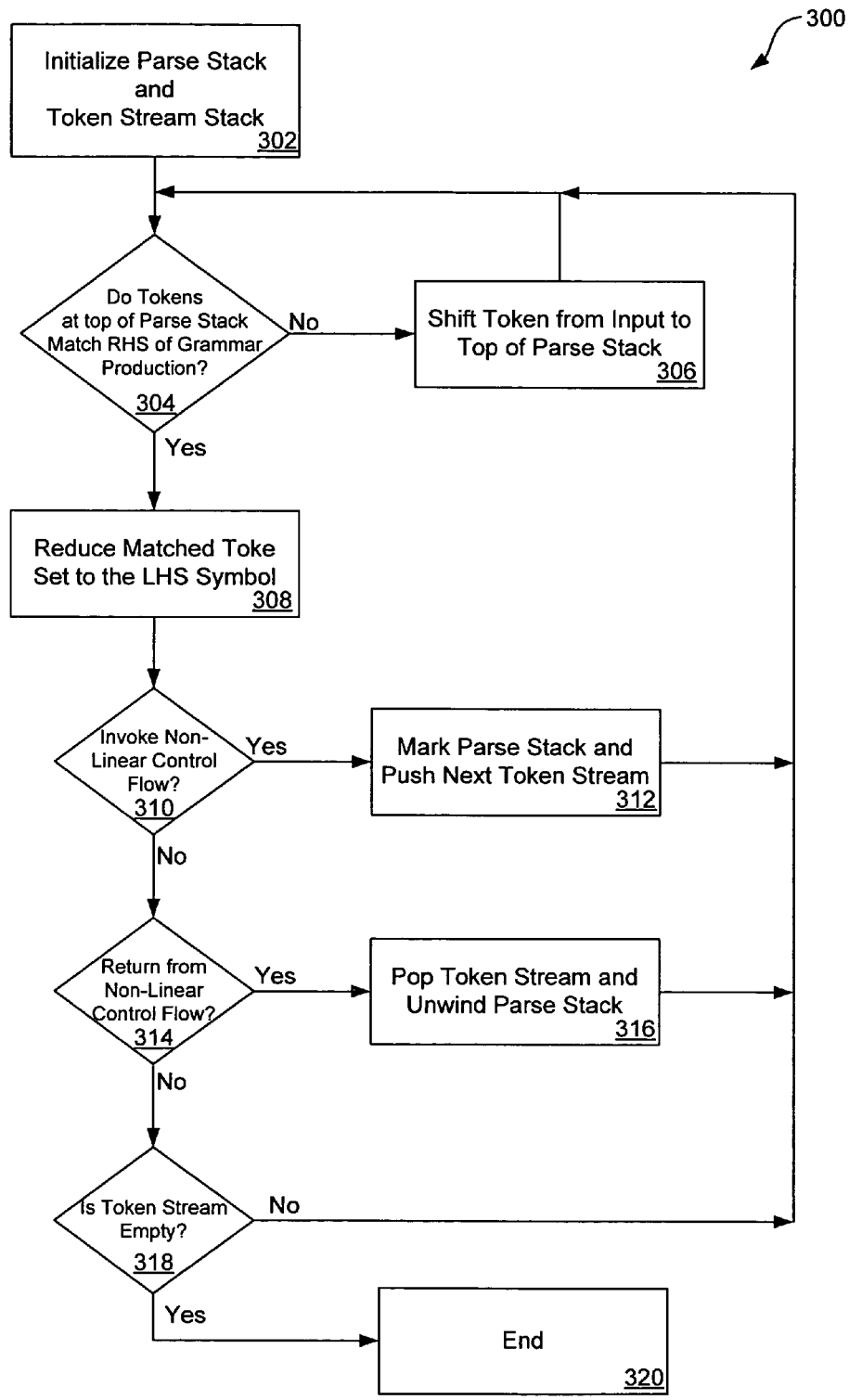
FIG. 3 illustrates an algorithm for carrying out parsing of nonlinear programming elements in accordance with some embodiments of the present invention.

A general algorithm for parsing CFG sentences using Shift/Reduce parsers is shown in FIG. 3, which is described in more detail below. To illustrate, following the standard rules for mathematical operator precedence and associativity (to resolve syntactic ambiguity), the first sentence above can be parsed by the following application of productions:

| Apply rule 4 | Convert '3' to an expr(3) |
|--------------|---------------------------|
| Apply rule 4 | Convert '4' to an expr(4) |
| Apply rule 4 | Convert '7' to an expr(7) |
| Apply rule 2 | Convert expr(4) * expr(7) to an expr |
| Apply rule 1 | Convert expr(3) + expr(28) to an expr |

In the foregoing illustration, semantics have been added to the process of parsing. When rule 2 was applied at step 4, the resulting value of the operation involving the two operands (4, 7) was computed. The value was then supplied to the subsequent matching process in which rule 1 was applied.

A parser works by building a (large) state table representing all possible transitions which might occur while analysing the syntax of a sentence. The state transition table for the above expression grammar would be similar to:

| State 0: | expr | → # expr '+' expr | |
|---|---|---|---|
| | | → # expr '*' expr | |
| | | → # '(' expr ')' | |
| | | → # CONSTANT | |
| State 1: | expr | → CONSTANT # | // reduce state |
| State 2: | expr | → '(' # expr ')' | |
| State 3: | expr | → '(' expr #')' | |
| State 4: | expr | → '(' expr ')' # | // reduce state |
| State 5: | expr | → expr # '+' expr | |
| | | →expr # '*' expr | |
| State 6: | expr | → expr '+' # expr | |
| State 7: | expr | → expr '+' expr # | // reduce state |
| State 8: | expr | → expr '*' # expr | |
| State 9: | expr | → expr '*' expr # | // reduce state |

The hash mark ('#') shows the position of the pattern detector as it traverses the input stream. As each input element is examined, the element is moved (or shifted) onto the parser's stack. When a RHS pattern is detected (as represented by reduce state 1 above where the hash mark is to the right of all symbols on the RHS), the collection of elements is removed from the top of the parser's stack (or reduced), and then rewritten as the single element on the LHS (which is placed upon the top of the parse stack).

A parser is an algorithm for pattern-matching streams of input tokens. The matching process can be used to perform dynamic semantic calculations that are driven by the phrase structure of the grammar (such as the proper ordering of multiplication and addition of the intermediate results). The expression evaluation grammar can be augmented with semantic actions:

| expr | → expr '+' expr | { $$ = $1 + $3; } | semantic augmentation (1) |
|---|---|---|---|
| | → expr '*' expr | { $$ = $1 * $3; } | semantic augmentation (2) |
| | → '(' expr ')' | { $$ = $2; } | semantic augmentation (3) |
| | → CONSTANT | { $$ = $1; } | semantic augmentation (4) |

In this grammar, semantic actions for each production are enclosed in curly braces "{}" after the RHS of the production. The attributes for non-terminal and terminal symbols are specified using the "$n" notation. For example, the first production specifies that the attribute value of the first 'expr' on the RHS is added to the attribute value of the second 'expr' on the RHS (which is the third symbol on the RHS), and the result of that calculation is passed up the stack as the attribute value of the rewritten expr for the LHS. By attaching these semantic functions to the productions, an unambiguous semantic specification of the expression language has been provided. The above notation (and semantic action strategy) has been in use for many years with parser generator systems such as YACC.

The above example assumes there is no operator overloading. Overloading means that a single symbol (such as "+") may have multiple interpretations (such as integer addition, floating point addition, or string concatenation). Most programming languages support operator overloading, at least for integer and floating point arithmetic.

One common strategy for implementing operator overloading is to check the types of the source operands when any instance of an overloaded operator is encountered. The above grammar may be modified to support overloading by performing explicit type checking of all operands in each semantic action where an overloaded operator is matched:

```
expr → expr '+' expr
    {
        if ($1.type == INTEGER) && ($3.type == INTEGER))
            $$ = $1.intValue + $3.intValue;
        else if (($1.type == INTEGER) && ($3.type == FLOAT))
            $$ = $1.intValue + $3.floatValue;
        else if (($1.type == FLOAT) && ($3.type == INTEGER))
            $$ = $1.floatValue + $3.intValue;
        else if (($1.type == FLOAT) && ($3.type == FLOAT))
            $$ = $1.floatValue + $3.floatValue;
        else
            // -- there may be other interpretations of "+"
    }
    → expr '*' expr
    {
        if ($1.type == INTEGER) && ($3.type == INTEGER))
            $$ = $1.intValue * $3.intValue;
        else if (($1.type == INTEGER) && ($3.type == FLOAT))
            $$ = $1.intValue * $3.floatValue;
        else if (($1.type == FLOAT) && ($3.type == INTEGER))
            $$ = $1.floatValue * $3.intValue;
        else if (($1.type == FLOAT) && ($3.type == FLOAT))
            $$ = $1.floatValue * $3.floatValue;
        else
            // -- there may be other interpretations of "*"
    }
    → '(' expr ')'              { $$ = $2; }
    → CONSTANT                  { $$ = $1; }
```

Using the above exemplary grammar, the determination of the operator's type (integer or floating point) must be performed by the semantic routine of each operator, each and every time an operator is about to be processed. The complexity of this determination increases with the number of datatypes supported by the language, and the number of overloaded operators in the language.

In accordance with embodiments of the invention, overloading is supported syntactically in the following grammar fragment:

| iexpr | → iexpr '+' iexpr | { $$ = $1 + $3; } | production rule (5) |
|---|---|---|---|
| | → iexpr '*' iexpr | { $$ = $1 * $3; } | production rule (6) |
| | → '(' iexpr ')' | { $$ = $2; } | production rule (7) |
| | → INT_CONST {$$ = $1;} | | production rule (8) |
| fexpr→ | fexpr '+' fexpr | { $$ = $1 + $3; } | production rule (9) |
| | → iexpr '+' fexpr | { $$ = $1 + $3; } | production rule (10) |
| | → fexpr '*' fexpr | { $$ = $1 * $3; } | production rule (11) |
| | → iexpr '*' fexpr | { $$ = $1 * $3; } | production rule (12) |
| | → '(' fexpr ')' | { $$ = $2; } | production rule (13) |
| | → iexpr | { $$ = $1; } | production rule (14) |
| | → FLOAT_CONST | { $$ = $1; } | production rule (15) |

The production rules (5) through (15) above can be used to carry out operator overloading in accordance with various embodiments of VMs described herein. Note that for most programming languages, mixed mode arithmetic (between integer and floating point values), one operand will be cast into the type of the other before performing the specified operation. Production rule (8) and production rule (15) are type productions in which constants of the given type are matched. Production rule (14) is a conversion production rule in which an integer type is converted to a float type. In general, interger operations will match productions 5 through 8, and floating point operations will match productions 9, 11, 13, 15. However, when integer and floating point operations are mixed, productions 10, 12 and 14 will apply. If an integer expression is found on the RIGHT subtree of an expression, then production 14 will convert it to a floating-point value. However, if an integer expression is found on the LEFT subtree of an an expression, it cannot be syntactically converted using production 14, since we cannot know the type of the right sub-tree until we've fully processed all operands/operations of that branch. Therefore, we add productions 10 and 12 to capture the case where the left subtree has a type different than the right.

The above grammar fragment shows the interaction between the syntax and semantics. Two non-terminals ('iexpr' and 'fexpr') are used to differentiate integer and floating point expression trees. The type of the leaf of the expression tree (either INT_CONST or FLOAT_CONST) will determine the overall type of the expression sub-tree.

The examples shown and described here illustrate only synthesized attributes (that is, semantic information flows only up the parse tree). Although all semantic functions can be computed using only synthesized attributes, the implementation of such a system can be inefficient. For the management of context, it is desirable to support inherited attributes.

FIG. 1 illustrates and exemplary operating environment including a compiler and virtual machine 140 in accordance with one embodiment. In this embodiment, the compiler 120 translates the users' program(s) 110, which are usually saved in text format (e.g., source code), into an Intermediate Representation (IR), which might be saved to a disk 130. The IR is read by the VM, and the resulting program may access a database 150, files 160 or the accessible network 170. As discussed above, because most VMs are based upon Operational Semantic models, they use an IR that is tuple based; that is, the IR is a collection of abstract machine instructions.

In accordance with embodiments described herein, the IR represents a "lightweight" manipulation of source program. In these embodiments the source program is translated into a linear token form, and the static semantics are checked. The parsing algorithm uses structures of a context free grammar (CFG) parser, but is augmented in three ways:

1. Context sensitive parsing is accomplished by inserting new tokens into the token stream and/or by redirecting the token stream (possibly stacking and unstacking token stream iterators). By using context sensitive parsing in this way, the semantics of tokenized program statements are imparted to syntax specified in production rules.
2. Loops, conditional or unconditional branches, function calls and other nonlinear program flows can be parsed by manipulating token stream iterators. The specific behavior of the token stream iterators is under control of the dynamic semantics of the program under execution.
3. Parse State for non-completing nonlinear program flows is synchronized with the operation of the token stream iterators. This allows processing nonlinear control structures such as, but not limited to, break/continue (in loops), function call/return and try/catch blocks in a natural way.

If a program were merely a linear token stream with no nonlinear constructs and all data types were statically defined, then the grammar specified in production rule (1) through production rule (4) above would be sufficient to interpret the token stream and establish the token stream's semantics.

Embodiments of the present invention can support efficient processing of dynamically typed languages. To illustrate, the above production rules and concepts are applied below in a particular exemplary scenario.

Many programming languages (Perl, PHP, SmallTalk, Basic, etc.) support dynamic typing of variables. This means that a variable can hold different data types (integers, strings, floating point numbers, etc.) at different times of program execution. For example:

a=17;
a=3.141592654;
a="Hello World";
b=23;
. . .
c=a+b;

All of these assignments to "a" and "b" are legal within a dynamically typed language. However, the assignment to "c" is problematic because the "+" operator is overloaded. The operator "+" might be integer addition, floating point addition or string concatenation depending upon the type of its operands. If one were interpreting these statements using recursive functions (while traversing a graph-based IR), then each operand of each expression could be explicitly checked, and the appropriate routine called based upon operand type. However, to employ a CFG parser to specify the interpreter, dynamic typing is problematic, and the grammar from section semantic augmentations (1)-(4) above [082]can no longer be applied.

Type disambiguation of variables can be implemented by inserting context tokens into the parse stream based upon the context of the executing program.

In addition to the base grammar of production rules (5)-(15) above, embodiments of the present invention can include the following productions (and semantic actions)

```
iexpr → variable INT_CONST      { $$ = $2; }    production rule (16)
fexpr → variable FLOAT_CONST    { $$ = $2; }    production rule (17)
variable → VARIABLE                             production rule (18)
{
    if ($1.type == "integer")
        prependTokenStream( INT_CONST, $1.value )
    else
        prependTokenStream( FLOAT_CONST, $1.value )
}
```

Production rule (18) above performs a context-sensitive syntactic operation. If the data type of the variable is "integer", then the INT_CONST token is prepended to the token stream along with the current integer value of the variable. In this case, the first production of the group will transform that sub-tree into an "iexpr". A similar scenario will occur if the variable is a "floating point" value. Formally, these productions are actually:

variable INT_CONST→VARIABLE         production rule (19)

variable FLOAT_CONST→VARIABLE       production rule (20)

where the appropriate pattern is selected based upon the context (i.e. the type of VARIABLE).

An illustrative scenario is now presented to demonstrate an embodiment of a process for type determination using direct execution. Consider the expression:

$$3.14159 + y*7$$

Assume that the value currently held in the variable "y" is an integer value of "5". The token stream for the above fragment would comprise the following 5 tokens:

| Float_CONST | + | VARIABLE | * | Int_CONST |
|---|---|---|---|---|
| 3.14159 | | "y" | | 7 |

After the first shift, the parse stack and token stream would look like:

| Parse Stack | | Token Stream | | |
|---|---|---|---|---|
| Float_CONST | + | VARIABLE | * | Int_CONST |
| 3.14159 | | "y" | | 7 |

After the first reduction (by the production "fexpr ->Float_CONST" (production rule (15) above), the system state looks like:

| Parse Stack | | Token Stream | | |
|---|---|---|---|---|
| fexpr | + | VARIABLE | * | Int_CONST |
| 3.14159 | | "y" | | 7 |

After the next 2 shifts, the system state would look like:

| Parse Stack | | | | Token Stream |
|---|---|---|---|---|
| fexpr | + | VARIABLE | * | Int_CONST |
| 3.14159 | | "y" | | 7 |

During the reduction process, the system looks at its symbol table to determine the type of the variable "y", which it determines to be an integer value of "5". After this reduction, the system state looks like:

| Parse Stack | | | Token Stream | | |
|---|---|---|---|---|---|
| fexpr | + | variable | Int_CONST | * | Int_CONST |
| 3.14159 | | | 5 | | 7 |

Note that the token "Int_CONST" has been prepended to the head of the token stream, along with the current value of the variable "y".

The next shift would leave the system in the following state:

| Parse Stack | | | | Token Stream | |
|---|---|---|---|---|---|
| fexpr | + | variable | Int_CONST | * | Int_CONST |
| 3.14159 | | | 5 | | 7 |

Using the production
"iexpr->variable Int_CONST" (production rule (16) above), the foregoing sentence can be reduced to result in the following system state:

| Parse Stack | | | Token Stream |
|---|---|---|---|
| fexpr | + | iexpr | * | Int_CONST |
| 3.14159 | | 5 | | 7 |

The final two shifts would move the remainder of the token stream to the top of the parse stack:

| Parse Stack | | | | | |
|---|---|---|---|---|---|
| fexpr | + | iexpr | * | Int_CONST | Token Stream |
| 3.14159 | | 5 | | 7 | |

Using the production "iexpr->Int_CONST" (production rule (8) above), the foregoing sentence reduces to:

| Parse Stack | | | | | |
|---|---|---|---|---|---|
| fexpr | + | iexpr | * | iexpr | Token Stream |
| 3.14159 | | 5 | | 7 | |

Using the production "iexpr->iexpr*iexpr" (production rule (6) above), the foregoing sentence reduces to:

| Parse Stack | | | |
|---|---|---|---|
| Fexpr | + | iexpr | Token Stream |
| 3.14159 | | 35 | |

The type of the RIGHT subtree is inappropriate, so the parser will match the pattern: "fexpr->iexpr" (production rule (14) above), changing the parse stack to:

| Parse Stack | | | |
|---|---|---|---|
| Fexpr | + | fexpr | Token Stream |
| 3.14159 | | 35.0 | |

Applying the production "fexpr->fexpr+iexpr", the foregoing sentence finally reduces to:

| Parse Stack | Token Stream |
|---|---|
| fexpr | |
| 38.14159 | |

In accordance with various embodiments, context sensitive language processing involves insertion or injection, by semantic routines, of tokens into the token stream and directly executing the injected tokens. In the broadest case, this would include inserting the entire body of a nonlinear program element, such as a function a loop, at the head of the token stream. Although this will certainly work, this strategy complicates processing in the event that the entire injected stream is not executed, which can occur under many circumstances. For example, fewer than all the injected tokens may be executed when a function executes a RETURN statement (as shown below), or if a loop body executes a BREAK, CONTINUE, RETURN (assuming it is contained within a function) or if either code causes an exception to be raised.

This strategy works because the root of any sub-tree can be replaced by any element which has a syntactic equivalence. For example, the result of a function call is an expr, which is used in any arithmetic expression. Therefore, if the root position of the function sub-tree can be established on the parse stack (with a marker, for example), then the parser can, during operation, remove all elements from the parse stack which comprise the current execution state of the syntactic construct (in this case, an expression), and replace/rewrite those elements with their result syntactic type (i.e. an expr).

In cases where not all injected tokens will be executed, token stream management is more easily accomplished by using an ITERATOR to traverse the specific token stream, and using a stack of iterators to process the nested invocation of nonlinear control flows. Implementation and execution of nonlinear control flows using stack management routines and a stack of token stream iterators is employed in various embodiments. Use of token stream iterators is demonstrated using the execution of a recursive function. Consider the factorial function:

```
function fact ( p )                              -- function (1)
{
    if (p <= 1)
        return 1;
    else
        return p * fact ( p - 1 ) ;
    fi
}
```

Consider its use in the program snippet:

X=fact (3)+y;                                    statement (1)

For ease of illustration, it is assumed for this scenario that all variables in the programming language have integer data types. In addition to the expression grammar specified in semantic augmentations (1)-(4) [082], some embodiments include the following productions in the grammar:

```
expr       → head [^ HEAD ] * return expr       production rule (21)
stmtList   → stmt+                              production rule (22)
stmt       → VAR '=' expr                       production rule (23)
           → IF (true) stmtList ELSE [^ FI ] * FI
                                                production rule (24)
           → IF (false) [^ ELSE ] * ELSE stmtList FI
                                                production rule (25)
           → IF (false) [^ FI ] * FI
                                                production rule (26)
true       → expr { prependIfTrue( $1 ); } TRUE
false      → expr { prependIfFalse( $1 ); } FALSE
                                                production rule (27)
```

The notation within the square brackets ("[" and "]") is standard notation for regular expressions. Thus, productions 25 and 26 will skip the body of a THEN clause if the conditional expression evaluates to "false". This model for token skipping must also take into account that the body of the THEN clause may itself contain an IF/THEN/ELSE. The terminator of the nested IF statement must not interfere with the scanning of the parent THEN clause body. Thus, additional simple parsing schemes must be incorporated into the augmented VM parser to skip THEN clauses, ELSE clauses, WHILE loops, etc.

Exemplary Operations

Figure 2:
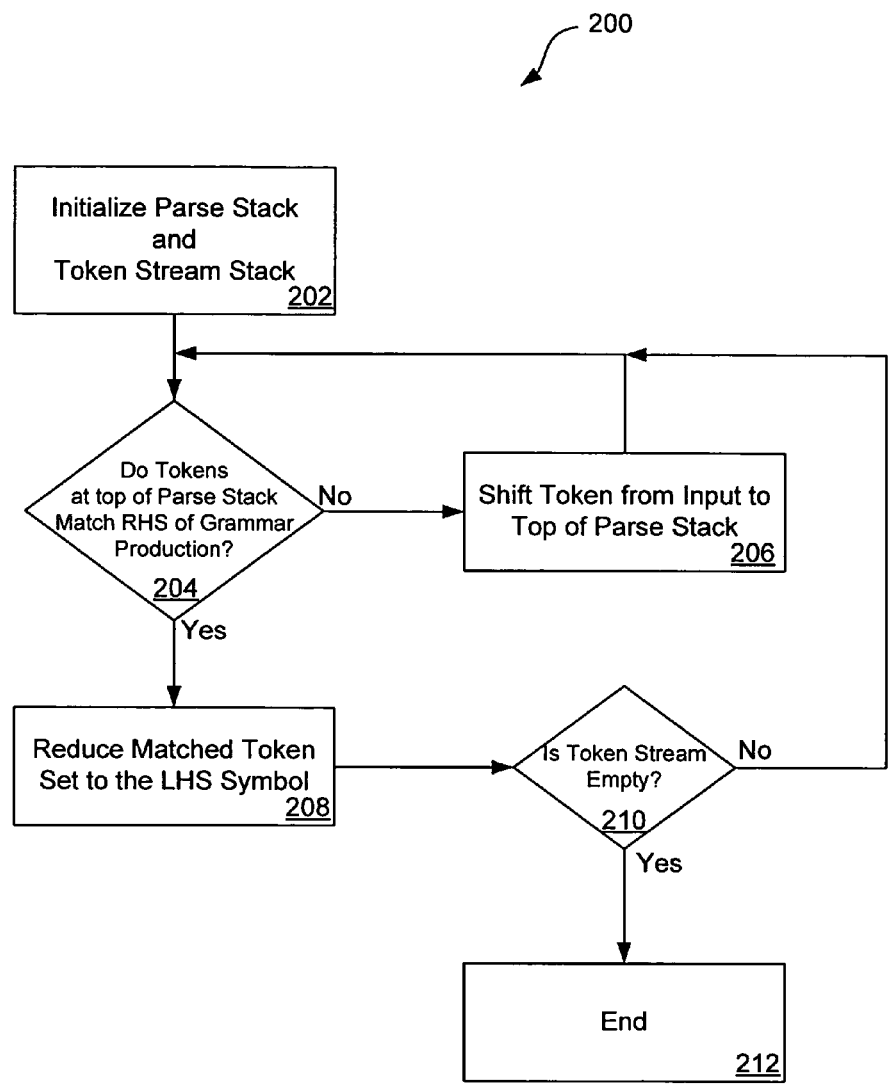
FIG. 2 illustrates an algorithm for carrying out parsing of linear programming elements in accordance with various embodiments of the present invention.

The exemplary operations shown and described herein can be carried out by a virtual machine (VM) in accordance with an embodiment of the present invention. FIG. 2 illustrates an exemplary algorithm 200 for parsing and input token stream in accordance with one embodiment. As discussed above, the parser analyzes the input stream using productions of a grammar. An initializing operation 202 initializes a parse stack and a token stream stack. Initializing the parse stack and the token stream stack may involve preparing a portion of memory to hold the stacks during the parsing process, and clearing the portion of memory.

A query operation 204 reads the token or tokens on the top of the parse stack and determines whether they match a RHS of a production of the grammar. The first time through the algorithm 200, there are no tokens on the parse stack, so the result of the query operation 202 is "No". The algorithm 200 branches "No" to a shifting operation 206. The shifting operation 206 shifts the next token from the token stream stack onto the parse stack. The algorithm 200 then returns to the query operation 204.

Shifting of tokens onto the parse stack continues until the query operation 204 determines that the tokens on the parse stack matches the RHS of a production rule. When the tokens of the parse stack match the RHS of a production, the algorithm 200 branches "Yes" to a reducing operation 208. The reducing operation 208 replaces the tokens on the parse stack with the LHS of the matched production.

Another query operation 210 determines whether the token string is empty. If the stack is not empty, the algorithm branches "No" to the first query operation 204. If the second query operation 210 determines that the parse stack is empty, the algorithm 200 branches "Yes" to end operation 212.

FIG. 3 is a flowchart illustrating an exemplary algorithm 300 for performing parsing of a token or tokens representing a nonlinear programming element. A nonlinear programming element could be a function call, a loop, or other. As in the previous algorithm 200, an initializing operation 302 initializes a parse stack and a token stream stack. A query operation 304 then determines whether the tokens on the parse stack match the RHS of a production. If not, the algorithm 300 branches "No" to a shifting operation 306, which shifts input tokens onto the parse stack. The input tokens are shifted from the token stream stack onto the parse stack. After shifting tokens on the parse stack, the algorithm 300 branches back to the query operation 304.

However, if the query operation 304 determines that the token or tokens on the parse stack do match the RHS of a production, the algorithm branches "Yes" to a reducing operation 308. The reducing operation 308 replaces the token or tokens on parse stack that match the RHS of the production with the corresponding LHS of the production.

Another query operation 310 then determines whether a nonlinear control flow should be invoked. This may involve determining whether the token(s), as reduced, represent a nonlinear programming element. If so, the algorithm 300 branches "Yes" to a marking operation 312. The marking operation 312 marks the top of the parse stack and pushes the new token stream onto the token stream stack. The algorithm 300 proceeds from the marking operation 312 to the first query operation 304.

If the query operation 310 determines that the a nonlinear control flow control flow should not be invoked, the algorithm 300 branches "No" to another query operation 314. The query operation 314 determines whether the VM has returned from invoking a nonlinear control flow. If the query operation 314 determines that the VM has returned from a nonlinear control flow, the algorithm 300 branches "Yes" to a popping operation 316, which pops the token stream and unwinds the parse stack. Popping operation 316 pops the evaluated nonlinear program segment off the token stream stack and synchronizes the evaluated nonlinear program segment with the parse stack. In one embodiment, synchronization is provided by placing a marker on the parse stack which is replaced by the result of the evaluated program segment. In addition, any unexecuted tokens from the executed program segment are removed from the input token stream. In this way, the nonlinear program segment on the parse stack is replaced with only relevant portions of the segment as evaluated.

If the query operation 314 determines that processing has not returned from a nonlinear control flow, the algorithm 300 branches "No" to another query operation 318. Query operation 318 determines whether the token stream is empty. If not, the algorithm 300 branches "No" back to the first query operation 304. If the parse stack is empty, the algorithm 300 branches "Yes" to end operation 320, which ends the parsing and direct execution process.

Figure 4:
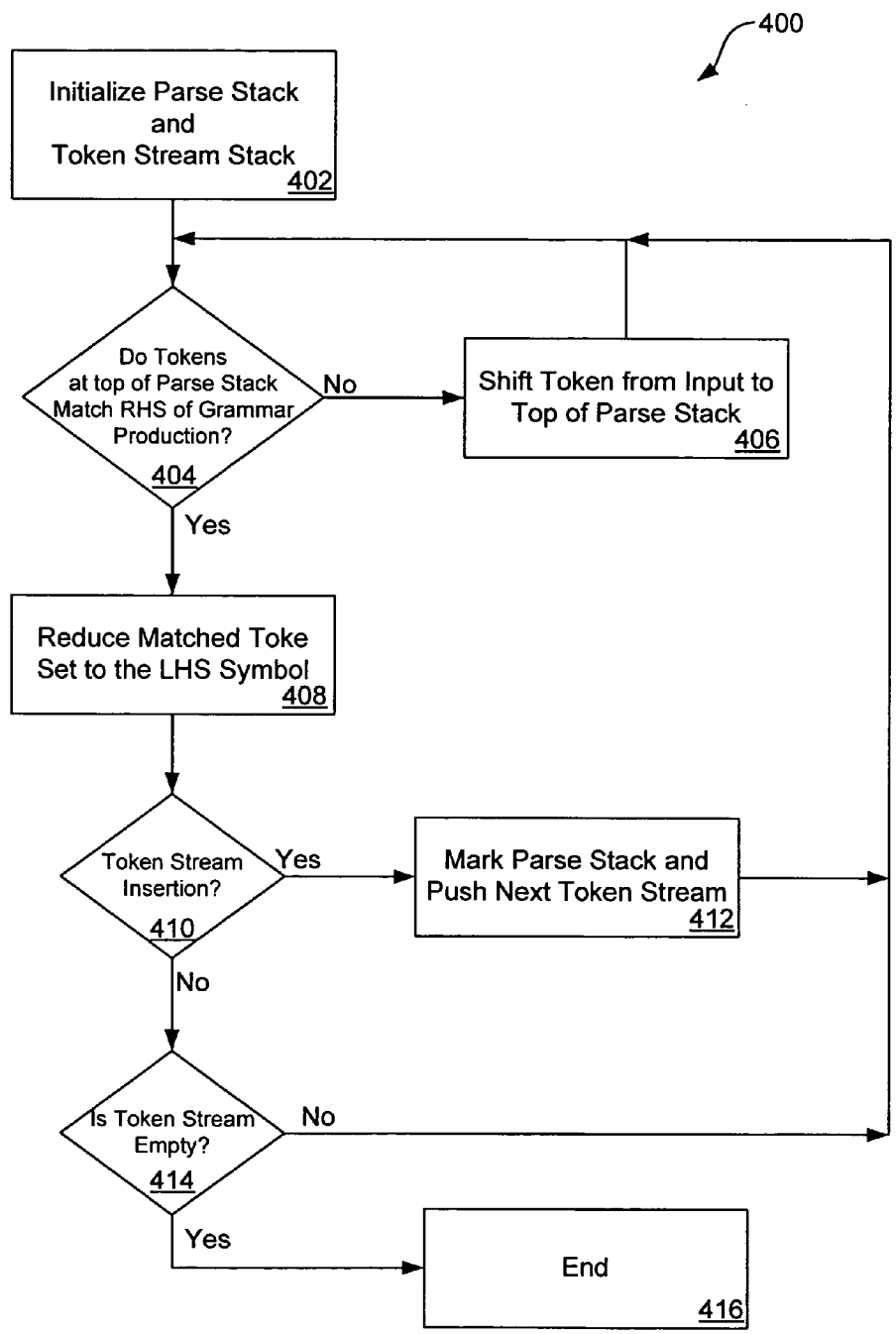
FIG. 4 illustrates an algorithm for carrying out parsing of non-linear programming elements in accordance with another embodiment of the present invention.

Turning to FIG. 4, there is shown another algorithm 400 for parsing and directly executing a program by a virtual machine. The algorithm 300 is based upon the static structure of the program. By contrast, the algorithm 400 of FIG. 4 is dynamic, such a new token stream is dependent upon the dynamic program execution flow.

As before, an initializing operation 402 initializes the parse stack and the token stream stack. A query operation 404 determines if tokens on the top of the parse stack match the RHS of a production rule. If not, the algorithm 400 branches "No" to a shifting operation 406, which shifts the next token(s) from the token stream stack onto the parse stack. If the tokens on the top of the parse stack do match the RHS of a production rule, the algorithm branches "Yes" to a reducing operation 408, which replaces the token or tokens on parse stack that match the RHS of the production with the corresponding LHS of the production rule.

Another query operation 410 then determines whether the token stream should be inserted. If so, the algorithm 400 branches "Yes" to a pushing operation 412 which pushes the token stream from the top of the parse stack to the top of the token stream stack. If the token stream is not to be inserted, the algorithm 400 branches "No" to another query operation 414, which determines whether the parse stack is empty. If the parse stack is not empty, the algorithm 400 branches "No" to the first query operation 404 to reiterate the process. If the parse stack is empty, the algorithm 400 branches "Yes" to an end operation 416, which stops the parsing and direct execution process.

The algorithms shown and described above can be rearranged and/or combined in numerous ways, depending on the particular implementation. For example, the algorithms illustrated in FIG. 3 and FIG. 4 may be combined such that the query operations 310, 314, and 410 are included in a single algorithm.

A Particular Illustrative Example

FIGS. 5-13 present an illustrative scenario to demonstrate parsing and direct execution of a nonlinear programming element in accordance with one embodiment. It is to be understood that FIGS. 5-13 illustrate only one exemplary scenario, and that the general process illustrated could be beneficially applied to a very broad range of nonlinear programming elements, such as, but not limited to, other functions and branches within programs. The particular program sentence being parsed and directly executed in FIGS. 5-13 is:

$X$=fact(3)+$y$,            assignment statement wherein "fact(n)" represents a call to the factorial function. In this particular scenario, for ease of illustration, it is assumed that the constant number three is a parameter of the factorial function. The expression "X" is a variable, whose value is to be determined by the assignment of the sentence, and the expression "y" is a variable whose value is assumed to be accessible from memory. The primary focus of this scenario is upon the process of parsing and directly executing the nonlinear element "fact(3)".

The scenario shown in FIGS. 5-13 is illustrated through the use of the parse stack and the token stream stack as they transition through different states as a result of matching, reduction, pushing, popping, evaluation, etc. In this sense, FIGS. 5-13 can be thought of as showing snapshots of the parse stack and the token stream stack. For purposes of illustration, snapshots of the parse stack and snapshots of the token stream stack are each referred to with a callout number followed by a lower case letter. The callout number relates to the associated stack (parse stack 500, token stream stack 502), and the lower case letter corresponds to a state snapshot. Note that for both the parse stack 500 and the token stream stack 502 both the token name and the associated attribute are shown. The tokenized input stream for the above assignment statement has the following structure:

| VAR | = | FUNC | ( | CONST | ) | + | VAR |
|-----|---|------|---|-------|---|---|-----|
| X   |   | Fact |   | 3     |   |   | y   |

The cells in the top row show the token value (VAR, FUNC, etc.), whereas the cells in the bottom row show the specific attribute for the token (the variable "x", the function "fact"). The parse stack 500 shows these values as they are shifted onto the stack during input scanning.

Note that in the diagrams used to demonstrate the operation of the function call, that both the parse stack 500 and the token stream stack 502 grow downward. As such, in these illustrations the "top" of the stack is on the bottom of the diagram.

Figure 5:
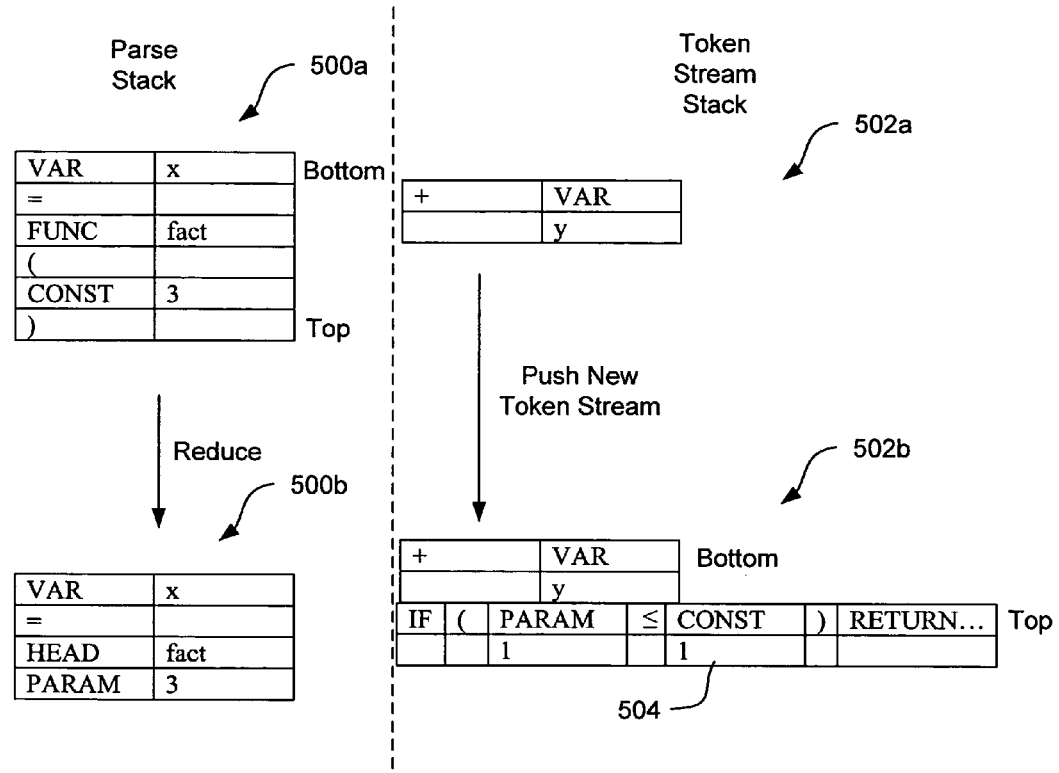
FIGS. 5-13 illustrate an exemplary scenario involving parsing and directly executing a nonlinear programming element in accordance with one or more embodiments of the present invention.

Beginning with FIG. 5 in this particular scenario, the parse stack 500a and the token stream stack 502a are in a state resulting after the VM has matched the pattern for the first function call (i.e., "fact(3)"), and prior to reduction of the matched token. As shown by the parse stack 500b, the process of reducing the parse stack 500a replaces the function call information with a marker for HEAD and the parameter list to the function. The HEAD marker has attribute "fact" (i.e., the name of the function), and the PARAMETER marker has attribute "3".

On the right side of FIG. 5 is shown the token stream stack 502. A token stream iterator referencing the remainder of the original assignment statement "+(VAR) "y" is at the bottom of the token stream stack. As a result of reduction of "fact(3)" on the parse stack 500b a token stream iterator 504 for the factorial function body has been placed at the top of the token stream stack 502b. The iterator 504 is composed of an "IF/THEN" clause corresponding to production (21) shown above. As shown in the specification of function (1) above (but not in FIG. 5), a closing FI is inserted at the end of the IF/THEN clause. Note that the token stream stack 502b has a reference to PARAM with an attribute of "1", which indicates that the referenced variable is a function parameter, and it is the first function parameter. The CONST attribute is also "1". As such, the "less than or equal to" (≦) clause in the iterator forms a template, wherein semantic values are determined based on positions of parameters defined within the usage context. With the new token stream iterator in place, and the parse stack properly synchronized, the factorial function on the token stream stack 502*b* is now evaluated.

Figure 6:
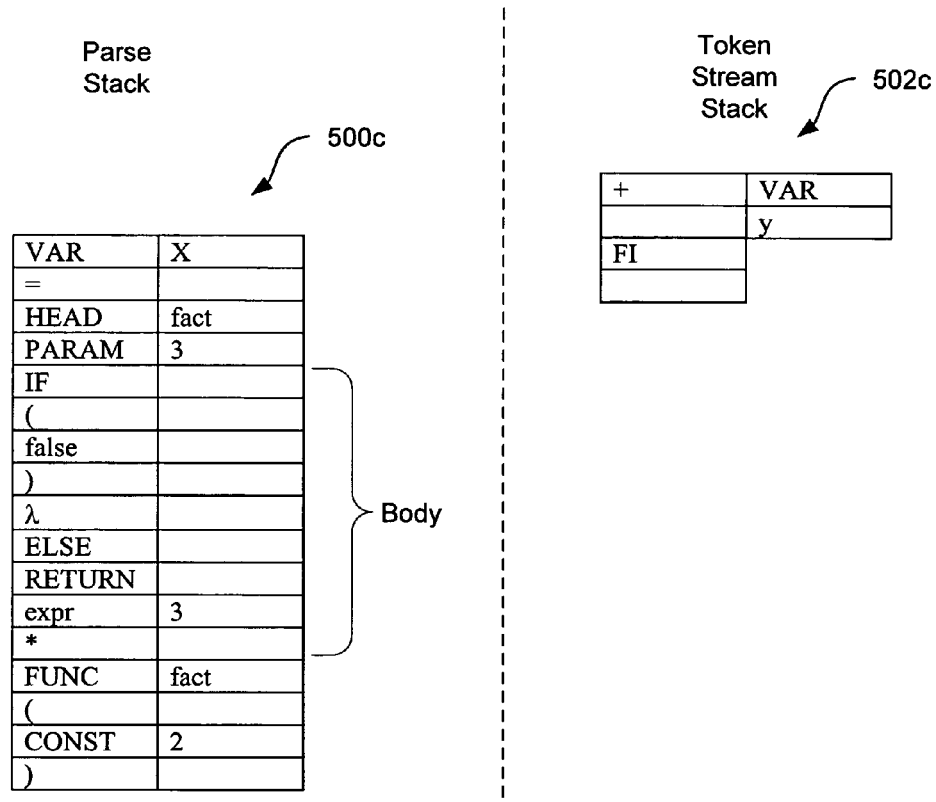

FIG. 6 shows the system state of the parse stack 500*c* and the token stream stack 502*c* after the completion of the first invocation of the factorial function. The first invocation of the factorial function is evaluated with the parameter of 3. Since the function parameter is greater than 1, the "THEN" clause of the function (see Function 1 above [0111]) is ignored, and the body of the "ELSE" clause is processed. Note that the token stream of the factorial function has consumed all input up to but not including the closing FI of the function.

Pushed onto the parse stack 500*c* is the body of the first factorial function and tokens representing the second invocation of the factorial function. The body of the first factorial function call includes the evaluation of the statements in the function call (see Function 1 shown above). The tokens representing the second factorial function include the constant 2, which corresponds to the next parameter to be evaluated in the second invocation of the factorial function.

Figure 7:
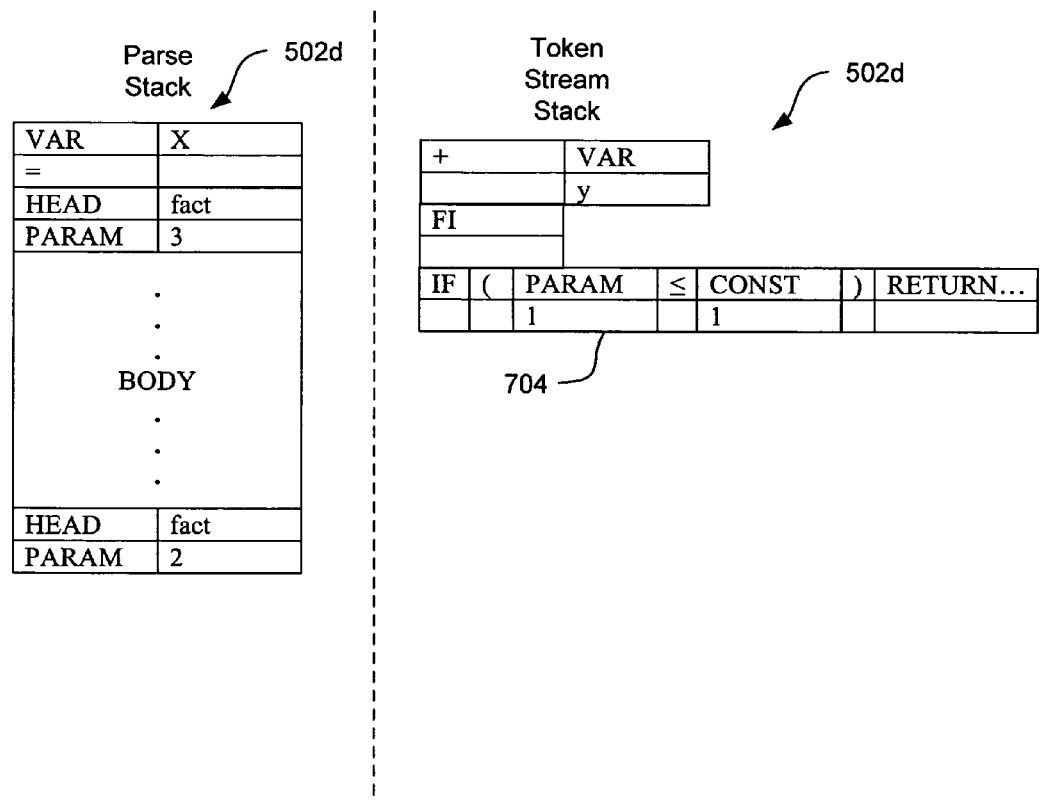

FIG. 7 shows the system state of the parse stack 500*d* and the token stream 502*d* after pattern matching the second factorial call. As with the first factorial function call, the FUNC token is replaced with a HEAD marker on the parse stack 500*d* and the parameter to the function is placed onto the stack. Those skilled in the art will recognize that in this embodiment, the parsing and direct execution results putting the formerly recursive call into a linear form. A new token stream iterator 704 for the function body is pushed onto the token stream stack 502*c*. The iterator 704 points to the body of the factorial function, with a PARAM attribute of 1 and a CONST of 1, corresponding to the first parameter in the usage context.

Figure 8:
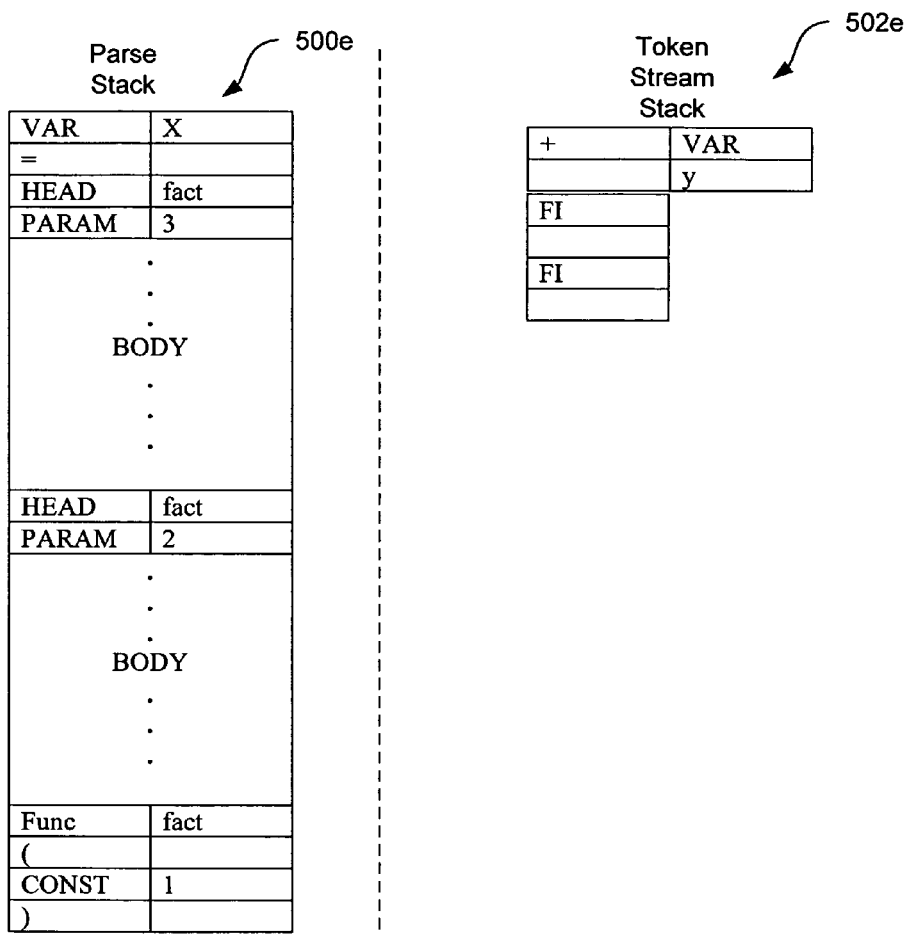

FIG. 8 shows the system state of the parse stack 500*e* and the token stream stack 502*e* after completing the scan and evaluation of the function body for the second call to factorial. As with the first function evaluation, since the value of the function parameter ("2") is greater than 1, the THEN clause of the function is ignored, and the body of the ELSE clause is processed. Again, the tokens comprising the function body have been consumed to the point of the closing FI token. The tokens are pushed onto the parse stack 500*e*, after the function statements are evaluated. The parameter for the next factorial call is "1", and is pushed onto the parse stack 500*e*.

Figure 9:
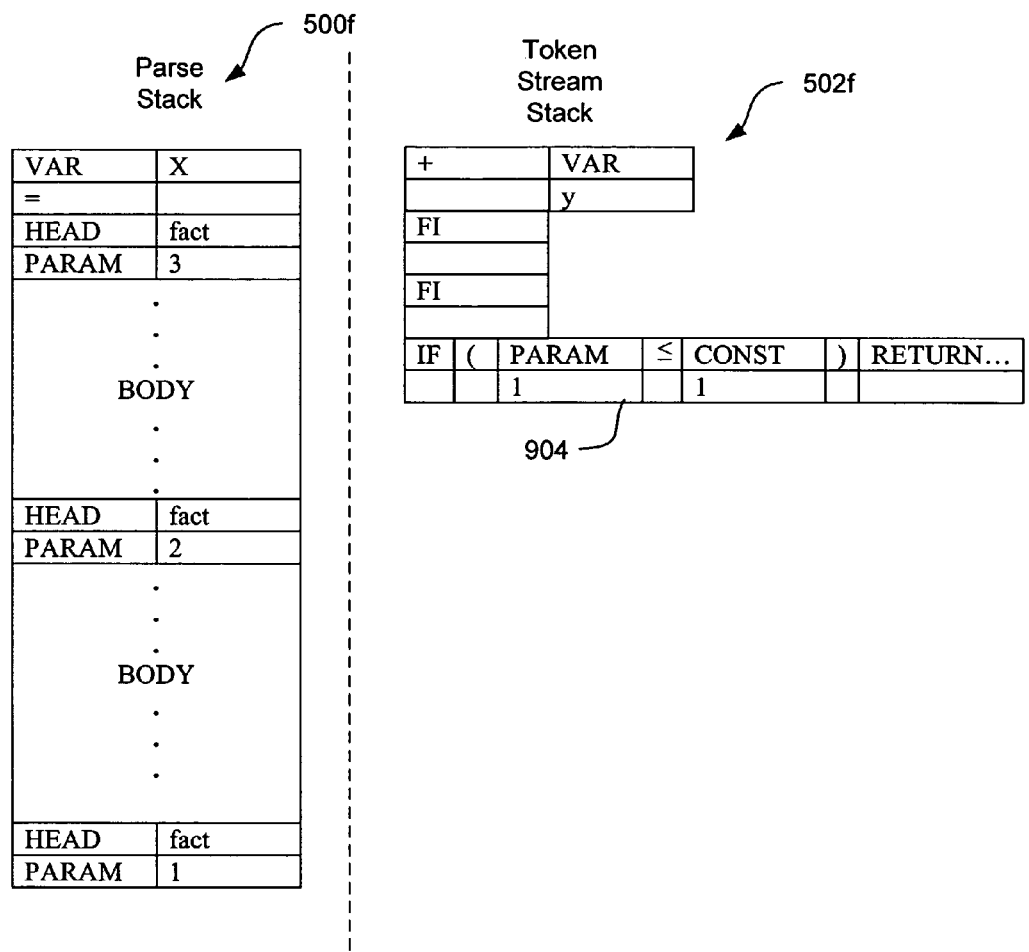

FIG. 9 shows the system state of the parse stack 500*f* and the token stream stack 502*f* after processing the final recursive function call. A third HEAD marker has been inserted onto the stack. Once again, the token stream stack has a new token stream iterator 904 pushed to the top, which points to the body of the factorial function.

Figure 10:
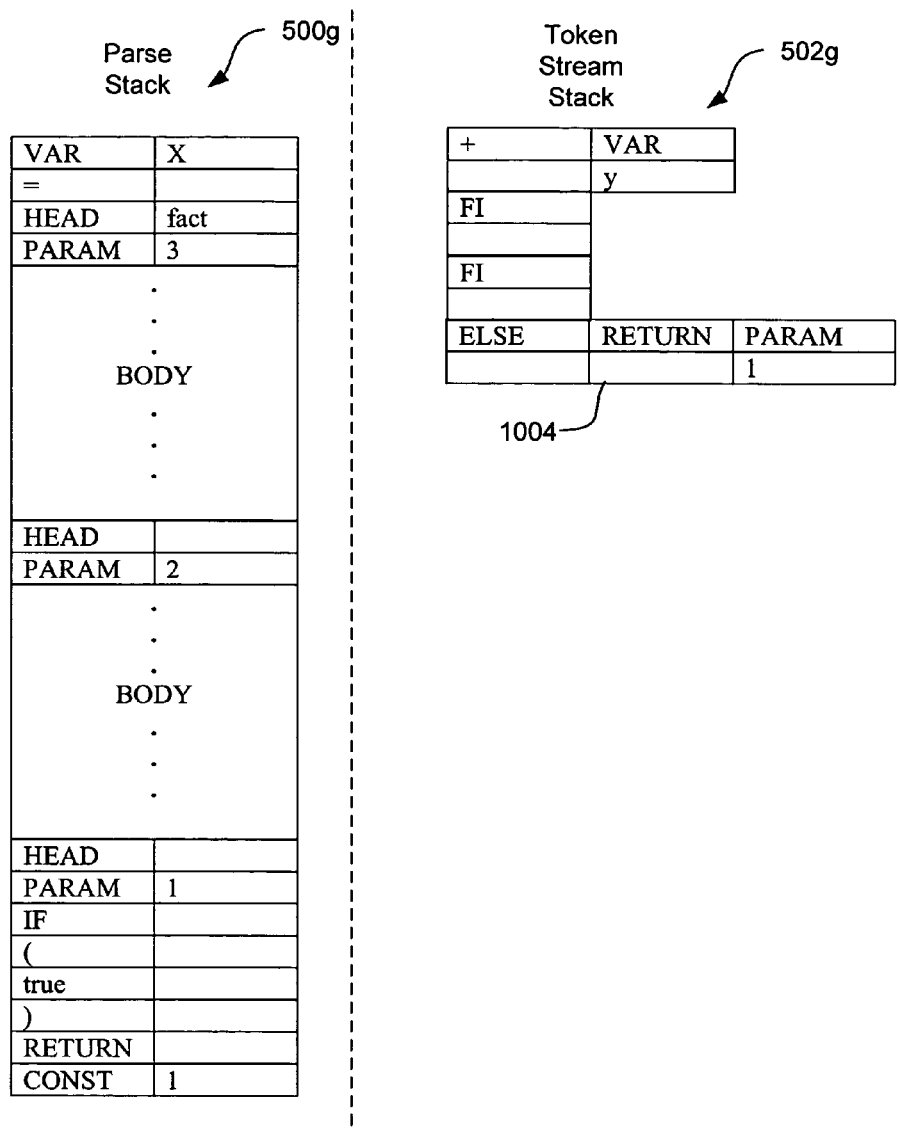

FIG. 10 shows the system state of the parse stack 500*g* and the token stream stack 502*g* after completing the processing of the last recursive instance of the factorial function. The parameter to the last factorial function call was "1", so the THEN clause of the condition is processed and the function will return a constant "1". The token stream stack shows that the remaining tokens of the function (comprising the ELSE clause 1004 of the condition) remain unprocessed in the token stream, while the two preceding factorial invocations remain stacked on the parse stack (500*g*) and token stream stack (502*g*).

Figure 11:
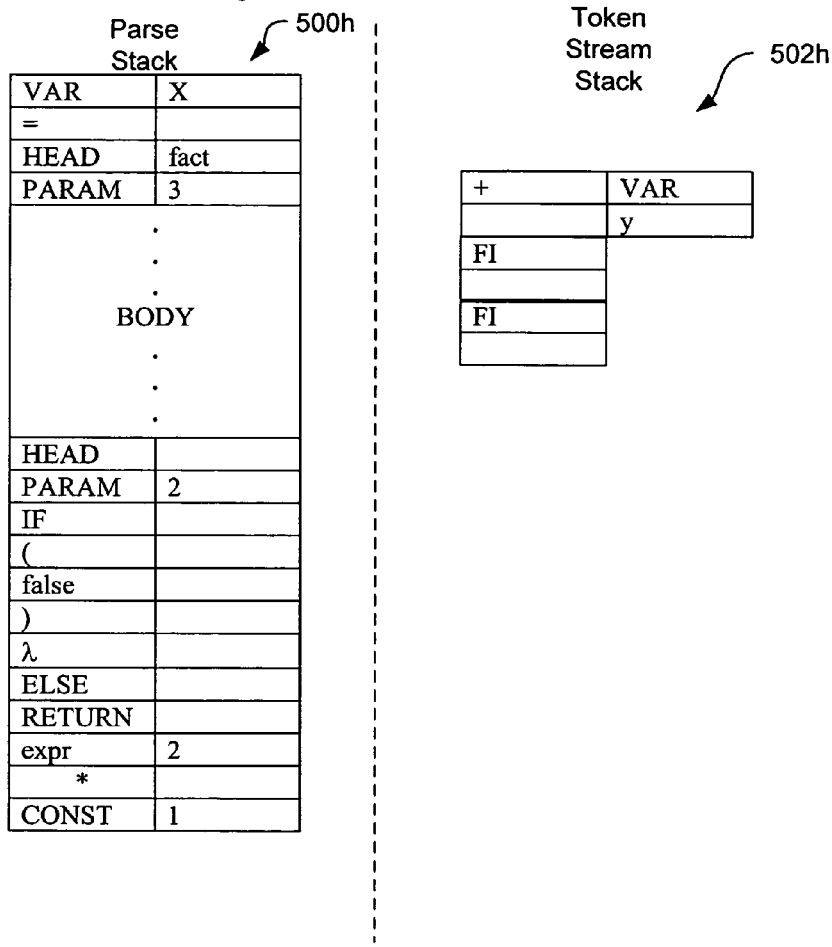

FIG. 11 shows the system state of the parse stack 500*h* and the token stream stack 502*h* after processing the RETURN from the final function invocation. All elements on the parse stack up to and including the HEAD marker for the last function invocation have been removed, and replaced with the result of the function (i.e., a CONST "1"). The token stream stack has also been popped, and the iterator 1004 for the token stream for the final function invocation has been removed. Note that the remaining tokens of the final token stream iterator 1004 were never processed, based upon the dynamic semantics of the program.

Figure 12:
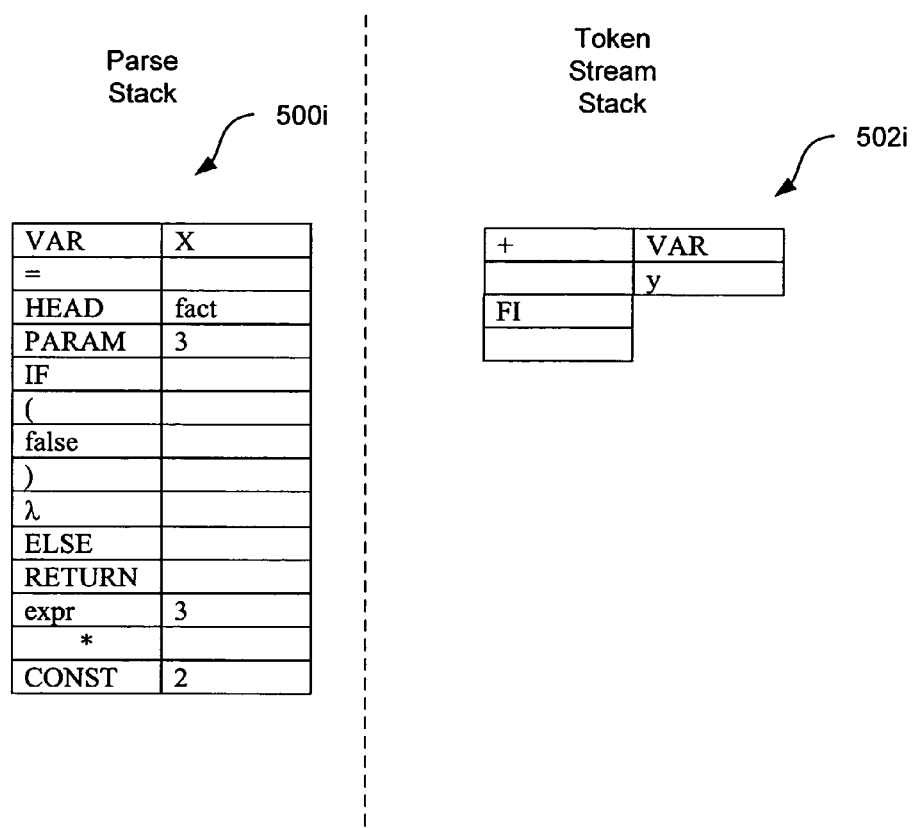

FIG. 12 shows the system state of the parse stack 500*i* and the token stream stack 502*i* after processing the RETURN from the second function invocation. An intervening multiplication of the parameter of the second invocation ("2") and the result of the base function return ("1") has been executed. All elements on the parse stack up to and including its HEAD marker have been removed and replaced with the result of the multiplication (i.e. a CONST "2"). In addition, the token stream stack has been popped and the iterator 704 for the second function invocation has been removed.

Figure 13:
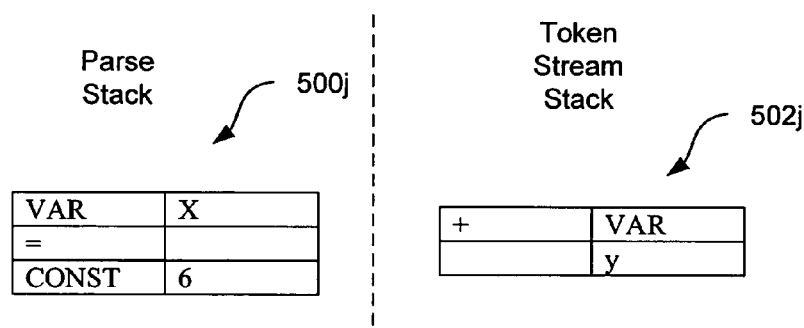

FIG. 13 shows the system state of the parse stack 500*j* and the token stream stack 502*j* after processing the RETURN from the first function invocation. An intervening multiplication of the parameter of the first invocation ("3") and the result of the base function return ("2") has been executed. All elements on the parse stack up to and including its HEAD marker have been removed and replaced with the result of the multiplication (i.e. a CONST "6"). In addition, the token stream stack has been popped and the iterator for the first function invocation has been removed. The only iterator 504 left on the token stream stack is the remaining tokens associated with the initial assignment statement.

The above illustrative scenario has demonstrated:

The parse state stack manipulation,

The token stream stack manipulation,

Context sensitive token insertion into the scanning/function evaluation stream.

The processing of a loop structure (WHILE, DO, FOR, etc.) can be handled in a similar fashion. A loop can be considered as a parameterless function. The occurrence of a BREAK statement can be processed as the RETURN statement is processed as described above with regard to a function. A CONTINUE statement is similar; however, upon execution it synchronizes the parse stack, then restarts the associated token stream iterator at the beginning of the token stream.

The techniques described above also works with parsers implemented using mutually recursive functions (so-called recursive descent parsers), whether hand written or automatically generated.

Exemplary Computer System

Figure 14:
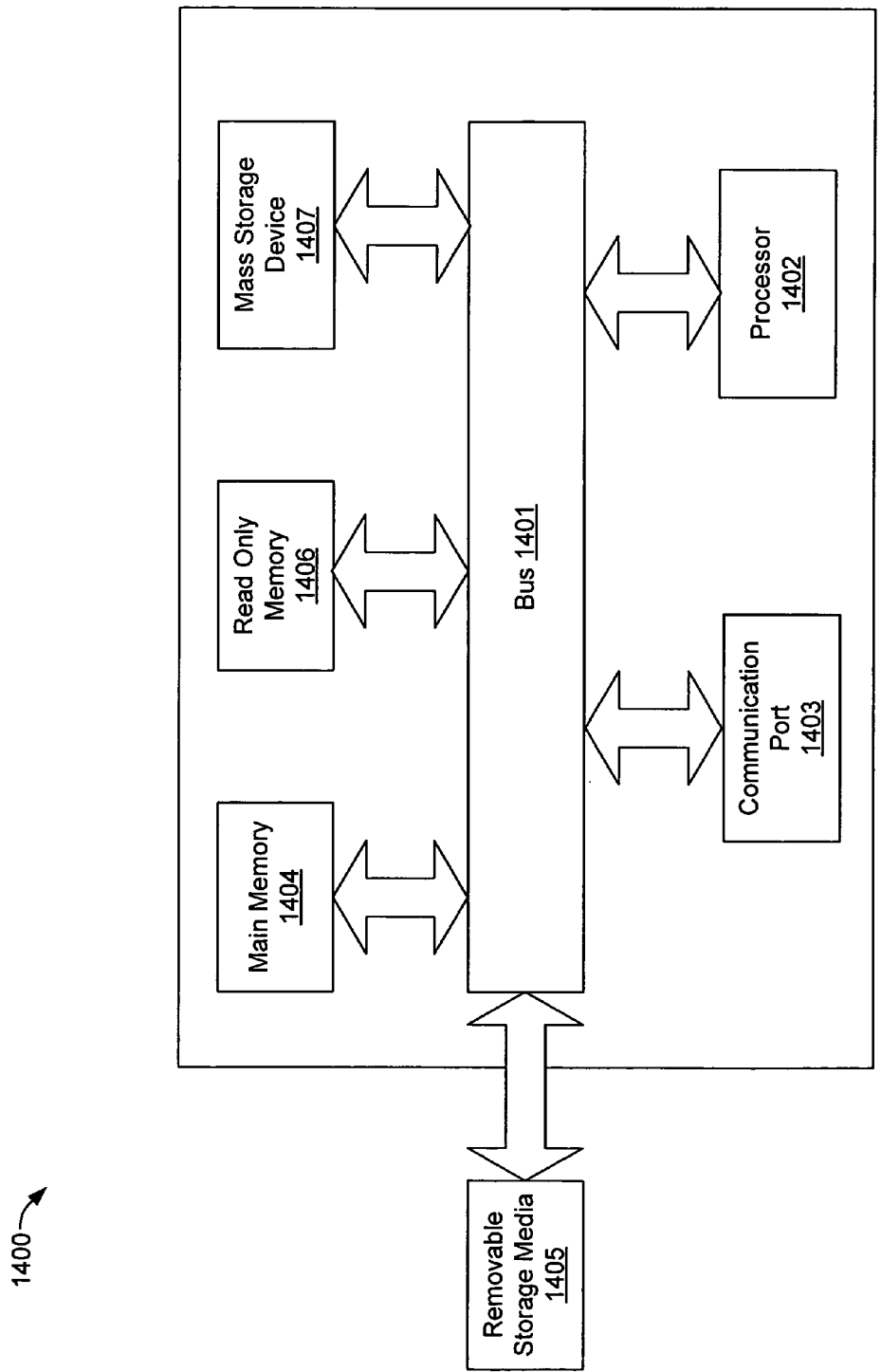
FIG. 14 illustrates an exemplary a computer system with which embodiments of the present invention may be utilized.

Embodiments of the present invention include various steps. A variety of these steps may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 14 is an example of a computer system 1400 with which embodiments of the present invention may be utilized. According to the present example, the computer system includes a bus 1401, at least one processor 1402, at least one communication port 1403, a main memory 1404, a removable storage media 1405, a read only memory 1406, and a mass storage 1407.

Processor(s) 1402 can be any know processor, such as, but not limited to, an Intel® Itanium® or Itanium 2® processor(s), or AMD® Opteron® or Athlon MP® processor(s), or Motorola® lines of processors. Communication port(s) 1403 can be any of an RS-232 port for use with a modem based dialup connection, a 10/100 Ethernet port, a Universal Serial Bus (USB) port, or a Gigabit port using copper or fiber. Communication port(s) 1403 may be chosen depending on a network such a Local Area Network (LAN), Wide Area Network (WAN), or any network to which the computer system 1400 connects.

Main memory 1404 can be Random Access Memory (RAM), or any other dynamic storage device(s) commonly known in the art. Read only memory 1406 can be any static storage device(s) such as Programmable Read Only Memory (PROM) chips for storing static information such as instructions for processor 1402.

Mass storage 1407 can be used to store information and instructions. For example, hard disks such as the Adaptec® family of SCSI drives, an optical disc, an array of disks such as RAID, such as the Adaptec family of RAID drives, or any other mass storage devices may be used.

Bus 1401 communicatively couples processor(s) 1402 with the other memory, storage and communication blocks. Bus 1401 can be a PCI/PCI-X or SCSI based system bus depending on the storage devices used.

Removable storage media 1405 can be any kind of external hard-drives, floppy drives, IOMEGA® Zip Drives, Compact Disc—Read Only Memory (CD-ROM), Compact Disc—Re-Writable (CD-RW), Digital Video Dis—Read Only Memory (DVD-ROM).

The components described above are meant to exemplify some types of possibilities. In no way should the aforementioned examples limit the scope of the invention, as they are only exemplary embodiments.

In conclusion, embodiments of the present invention relate to systems, methods, media, and arrangements for directly executing a software program using a virtual machine. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A non-transitory computer-readable medium storing computer-executable instructions implementing a parser that has multiple parse states, wherein, when the instructions are executed by a computer, the instructions cause the computer to perform a process comprising:
   receiving a portion of a software program in an original linguistic form in a high level language, wherein the portion of the software program includes a nonlinear program element having a body;
   tokenizing the portion of the software program to generate an input stream of tokens representing the portion of the software program;
   and while retaining the original linguistic form, using a set of one or more production rules to control a parser to directly execute the nonlinear program element by manipulating a parse state and the input stream of tokens, wherein the one or more production rules enable the parser to perform type conversion and the one or more production rules enable the parser to insert an expression into the input stream of tokens to skip tokens in the input stream of tokens during execution of the nonlinear program element, and wherein directly executing comprises executing tokens until the dynamic end of the nonlinear program element is reached, and wherein manipulating the input stream of tokens comprises using the one or more production rules to perform type conversion on at least one token of the input stream of tokens and using the one or more production rules to insert expressions into the input stream of tokens to skip tokens during execution of the nonlinear program element.

2. The non-transitory computer-readable medium as recited in claim 1, wherein the nonlinear program element comprises a function containing one or more of a conditional statement, a BREAK statement, a CONTINUE statement, or a RETURN statement.

3. The non-transitory computer-readable medium as recited in claim 2, wherein directly executing the nonlinear program element comprises:
   marking a parse stack index;
   inserting a token stream representing the body of the function at the head of the input token stream;
   resetting the parse stack index after directly executing the inserted executed body of the function; and
   removing any unexecuted tokens from the input token stream.

4. The non-transitory computer-readable medium as recited in claim 3, further comprising forming an iterator over the sequence of tokens of the token stream and adding the iterator to a token stack.

5. The non-transitory computer-readable medium as recited in claim 1, wherein the nonlinear program element comprises a loop construct containing one or more of a conditional statement, a BREAK statement, a CONTINUE statement, or a RETURN statement.

6. The non-transitory computer-readable medium as recited in claim 1, wherein directly executing the nonlinear program element comprises:
   inserting the executed body of the loop construct at the head of the input token stream; and
   directly executing the body of the loop construct until the loop execution ends.

7. The non-transitory computer-readable medium as recited in claim 6, further comprising forming an iterator comprising tokens representing the body of the loop construct and adding the iterator to a token stack.

8. The non-transitory computer-readable medium as recited in claim 1, wherein the nonlinear program element comprises an exception handler having a try clause and a catch clause, the process further comprising:
   marking the beginning of the try clause in the parse stack; and
   upon detection of exception in the try clause, finding the mark point in the parse stack for the exception handler and discarding all tokens up to the end of the try clause.

9. The non-transitory computer-readable medium as recited in claim 1, wherein directly executing the nonlinear program element comprises table-driven parsing implementation of a grammar.

10. The non-transitory computer-readable medium as recited in claim 1, wherein directly executing the nonlinear program element comprises implementing a grammar with a parser using one or more recursive parsing functions.

11. The non-transitory computer-readable medium as recited in claim 10, wherein the one or more recursive parsing functions are mutually recursive.

12. The non-transitory computer-readable medium as recited in claim 1, further comprising injecting a token in the input token stream in a parser to facilitate runtime type conversion.

13. The non-transitory computer-readable medium as recited in claim 1, further comprising injecting a token in the input token stream in a parser to facilitate runtime program flow control.

14. A method for parsing and executing a software program, the method comprising:
receiving a portion of the software program in an original linguistic form in a high level language, wherein the portion of the software program includes a nonlinear program element having a body; and
tokenizing the portion of the software program to generate an input stream of tokens representing the portion of the software program;
while retaining the original linguistic form of the software program, using a set of one or more production rules by a parser to directly execute the nonlinear program element by manipulating a parse state and the input stream of tokens representing the body of the nonlinear program element, wherein the one or more production rules include a type conversion production rule useable by the parser to perform type conversion and production rules useable by the parser to insert an expression into the input stream of tokens to skip tokens in the input stream of tokens during execution of the nonlinear program element, and wherein directly executing comprises executing tokens until the dynamic end of the nonlinear program element is reached, and wherein manipulating the input stream of tokens comprises using the type conversion production rule to perform type conversion on at least one token of the input stream of tokens and using the one or more production rules to insert expressions to skip tokens during execution of the nonlinear program element.

15. The method as recited in claim 14, wherein the nonlinear program element comprises a function containing one or more of a conditional statement, a loop construct, a BREAK statement, a CONTINUE statement, or a RETURN statement.

16. The method as recited in claim 15, wherein directly executing the nonlinear program element comprises:
marking a parse stack index;
inserting a token stream representing the body of the function at the head of the input token stream;
resetting the parse stack index after directly executing the inserted executed body of the function; and
removing any unexecuted tokens from the input token stream.

17. The method as recited in claim 16, further comprising forming an iterator comprising tokens of the token stream and adding the iterator to a token stack.

18. The method as recited in claim 14, wherein the nonlinear program element comprises a loop construct containing one or more of a conditional statement, a BREAK statement, a CONTINUE statement, or a RETURN statement.

19. The method as recited in claim 14, wherein directly executing the nonlinear program element comprises:
inserting the executed body of the loop construct at the head of the input token stream; and
directly executing the body of the loop construct until the loop execution ends.

20. The method as recited in claim 19, further comprising forming an iterator comprising tokens representing the body of the loop construct and adding the iterator to a token stack.

21. The method as recited in claim 14, wherein the nonlinear program element comprises an exception handler having a try clause and a catch clause, the process further comprising:
marking the beginning of the try clause in the parse stack; and
upon detection of exception in the try clause, finding the mark point in the parse stack for the exception handler and discarding all tokens up to the end of the try clause.

22. The method as recited in claim 14, wherein directly executing the nonlinear program element comprises table-driven parsing implementation of a grammar.

23. The method as recited in claim 14, wherein directly executing the nonlinear program element comprises implementing a grammar with a parser using one or more recursive parsing functions.

24. The method as recited in claim 23, wherein the one or more recursive parsing functions are mutually recursive.

25. The method as recited in claim 14, further comprising injecting a token in the input token stream in a parser to facilitate runtime type conversion.

26. The method as recited in claim 14, further comprising injecting a token in the input token stream in a parser to facilitate runtime program flow control.

27. A system for parsing and executing an input software program written in an original linguistic form in a high level language, the system comprising:
at least one processor-readable medium storing executable instructions to implement:
a tokenizer operable to tokenize the software program to generate an input stream of tokens representing the software program;
a parser operable to use one or more production rules to directly execute a nonlinear program element in the software program, by manipulating a parse state and the input stream of tokens representing the body of the nonlinear program element, while preserving the original linguistic form of the software program, wherein the one or more production rules include a type conversion production rule useable by the parser to perform type conversion and production rules useable by the parser to insert an expression into the input stream of tokens to skip tokens in the input stream of tokens during execution of the nonlinear program element, and wherein manipulating the input stream of tokens comprises using the type conversion production rule to perform type conversion on at least one token of the input stream of tokens and using the one or more production rules to insert expressions to skip tokens during execution of the nonlinear program element; and
at least one processor operable to execute the executable instructions.

28. The system as recited in claim 27, wherein the nonlinear program element comprises a function.

29. The system as recited in claim 28, wherein the parser is further operable to:
mark a parse stack index;
insert a token stream representing the body of the function at the head of the input token stream;
reset the parse stack index after directly executing the inserted executed body of the function; and
remove any unexecuted tokens from the input token stream.

30. The system as recited in claim 29, wherein the parser is further operable to form an iterator comprising tokens of the token stream representing the body of the function and to add the iterator to a token stack.

31. The system as recited in claim 27, wherein the nonlinear program element comprises a loop construct.

32. The system as recited in claim 27, wherein the parser is further operable to:

insert the executed body of the loop construct at the head of the input token stream; and directly execute the body of the loop construct until the loop execution ends dynamically.

33. The system as recited in claim 32, wherein the parser is further operable to form an iterator comprising tokens representing the body of the loop construct and to add the iterator to a token stack.

34. The system as recited in claim 27, wherein the nonlinear program element comprises an exception handler having a try clause and a catch clause, and wherein the parser is further operable to:

mark the beginning of the try clause in the parse stack; and upon detection of an exception in the try clause, finding the mark point in the parse stack for the exception handler and discarding all tokens up to the end of the try clause.

35. The system as recited in claim 27, wherein the parser is table-driven.

36. The system as recited in claim 27, wherein the parser comprises one or more recursive parsing functions.

37. The system as recited in claim 36, wherein the one or more recursive parsing functions are mutually recursive.

38. The system as recited in claim 27, wherein the parser is further operable to inject a token in the input token stream to facilitate runtime type conversion.

39. The system as recited in claim 27, wherein the parser is further operable to inject a token in the input token stream to facilitate runtime program flow control.

40. A system for executing a software portion in an original linguistic form in a high level language, the system comprising:

a processor-readable medium storing instructions executable by a processor to implement:

a tokenizer configured to tokenize the software portion to generate an input stream of tokens representing the software portion;

a grammar including one or more production rules defining language patterns that enable a parser to match high level language patterns in the input stream of tokens to specific production rules, and then perform dynamic software execution, and wherein at least one production rule enables a parser to perform data type conversion, and wherein at least one production rule inserts an expression into a token stream to skip tokens during execution of a nonlinear program element of the software portion;

a parser configured to input the input stream of tokens in the original linguistic form, use the one or more production rules to match high level language patterns in the input stream of tokens to specific production rules, and dynamically execute the software portion by using the at least one production rule to perform data type conversion on at least one token of the input stream of tokens and using the at least one production rules to insert expressions into the input stream of tokens to skip tokens during execution of the nonlinear program element; and a processor configured to execute the instructions to cause the parser to execute the software portion.

* * * * *